United States Patent
Li et al.

(10) Patent No.: US 8,254,644 B2
(45) Date of Patent: Aug. 28, 2012

(54) METHOD, APPARATUS, AND PROGRAM FOR DETECTING FACIAL CHARACTERISTIC POINTS

(75) Inventors: Yuanzhong Li, Tokyo (JP); Sadato Akahori, Kanagawa-ken (JP); Kensuke Terakawa, Kanagawa-ken (JP); Yoshiro Kitamura, Kanagawa-ken (JP); Wataru Ito, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1011 days.

(21) Appl. No.: 12/278,616

(22) PCT Filed: Feb. 7, 2007

(86) PCT No.: PCT/JP2007/052541
§ 371 (c)(1),
(2), (4) Date: Aug. 7, 2008

(87) PCT Pub. No.: WO2007/091714
PCT Pub. Date: Aug. 16, 2007

(65) Prior Publication Data
US 2009/0010544 A1    Jan. 8, 2009

(30) Foreign Application Priority Data
Feb. 10, 2006  (JP) .................................. 2006-033554

(51) Int. Cl.
*G06K 9/00* (2006.01)
*G06K 9/46* (2006.01)
(52) U.S. Cl. ....................................... 382/118; 382/190
(58) Field of Classification Search .................... 382/118
See application file for complete search history.

(56) References Cited

U.S. PATENT DOCUMENTS

| | | | | |
|---|---|---|---|---|
| 5,410,609 A | * | 4/1995 | Kado et al. | 382/118 |
| 5,680,481 A | * | 10/1997 | Prasad et al. | 382/190 |
| 5,905,807 A | * | 5/1999 | Kado et al. | 382/118 |
| 5,995,639 A | * | 11/1999 | Kado et al. | 382/118 |
| 6,181,805 B1 | * | 1/2001 | Koike et al. | 382/118 |
| 7,130,453 B2 | * | 10/2006 | Kondo et al. | 382/117 |
| 7,764,828 B2 | * | 7/2010 | Sasaki et al. | 382/154 |

(Continued)

FOREIGN PATENT DOCUMENTS

JP   2004-30007 A   1/2004

(Continued)

OTHER PUBLICATIONS

Yuille, A.L.; Cohen, D.S.; Hallinan, P.W.; , "Feature extraction from faces using deformable templates," Computer Vision and Pattern Recognition, 1989. Proceedings CVPR '89., IEEE Computer Society Conference on , vol., no., pp. 104-109, Jun 4-8, 1989.*

(Continued)

*Primary Examiner* — Bhavesh Mehta
*Assistant Examiner* — Utpal Shah
(74) *Attorney, Agent, or Firm* — Birch, Stewart, Kolasch & Birch, LLP

(57) ABSTRACT

First, a face within an image, which is a target of detection, is detected. Detection data of the face is employed to detect eyes which are included in the face. Detection data of the eyes are employed to detect the inner and outer corners of the eyes. Detection data of the inner and outer corners of the eyes is employed to detect characteristic points of the upper and lower eyelids that represent the outline of the eyes.

14 Claims, 15 Drawing Sheets

U.S. PATENT DOCUMENTS

| | | | | |
|---|---|---|---|---|
| 7,821,409 | B2 * | 10/2010 | Ishida | 340/576 |
| 7,835,568 | B2 * | 11/2010 | Park et al. | 382/154 |
| 2005/0100195 | A1 | 5/2005 | Li | |
| 2006/0115157 | A1 * | 6/2006 | Mori et al. | 382/190 |

FOREIGN PATENT DOCUMENTS

| | | |
|---|---|---|
| JP | 2004-341844 A | 12/2004 |
| JP | 2005-18358 A | 1/2005 |
| JP | 2005-56124 A | 3/2005 |
| JP | 2005-56231 A | 3/2005 |
| JP | 2005-108197 A | 4/2005 |

OTHER PUBLICATIONS

Hu, M.; Worrall, S.; Sadka, A.H.; Kondoz, A.A.; , "Face feature detection and model design for 2D scalable model-based video coding," Visual Information Engineering, 2003. VIE 2003. International Conference on , vol., no., pp. 125-128, Jul. 7-9, 2003.*

Kapoor, A.; Picard, R.W.; , "Real-time, fully automatic upper facial feature tracking," Automatic Face and Gesture Recognition, 2002. Proceedings. Fifth IEEE International Conference on , vol., no., pp. 8-13, May 20-21, 2002.*

* cited by examiner

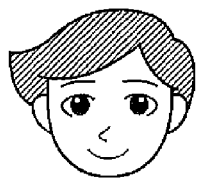 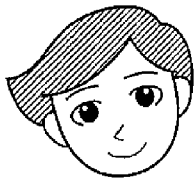 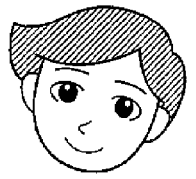
FIG.11A  FIG.11B  FIG.11C
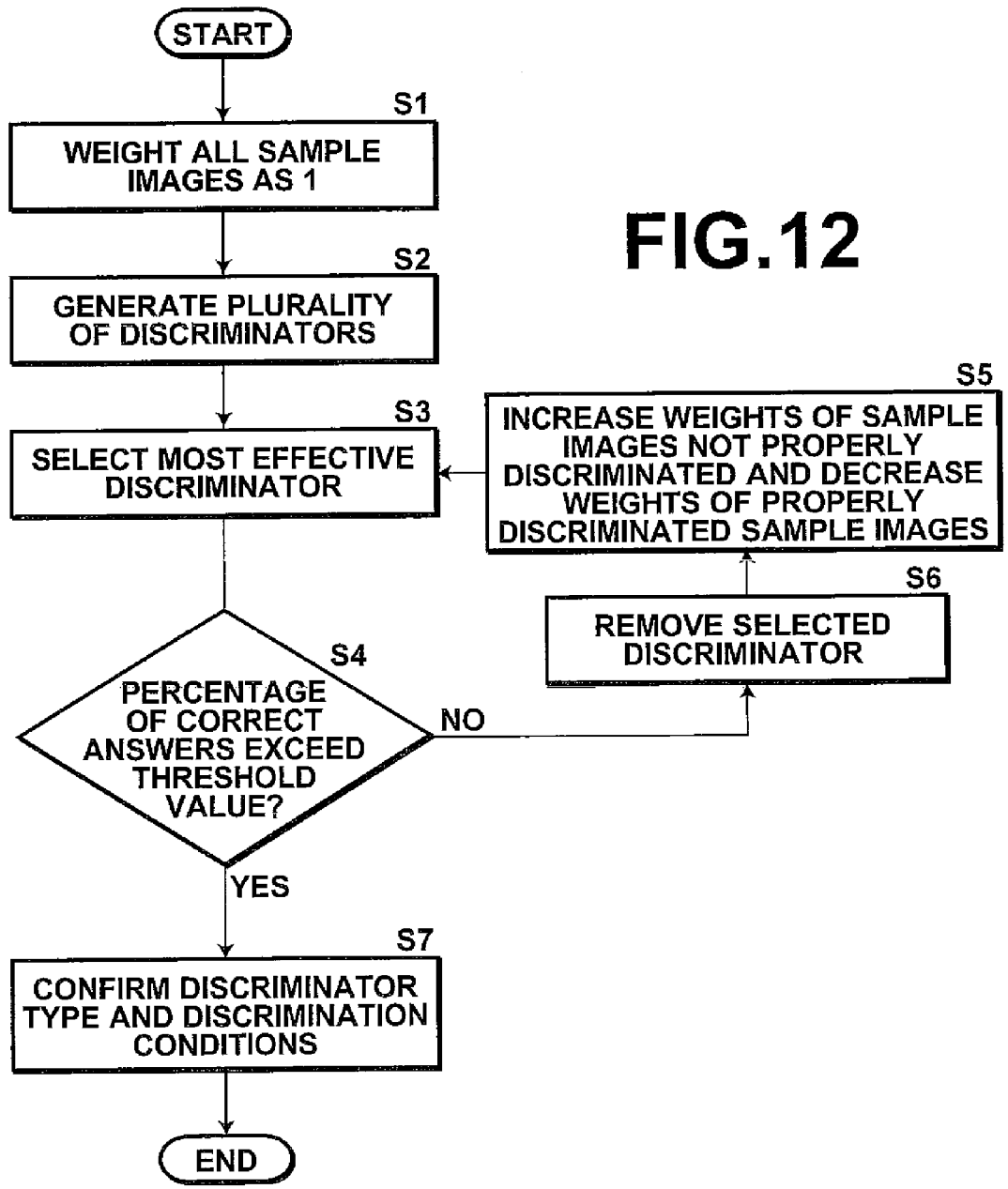
FIG.12

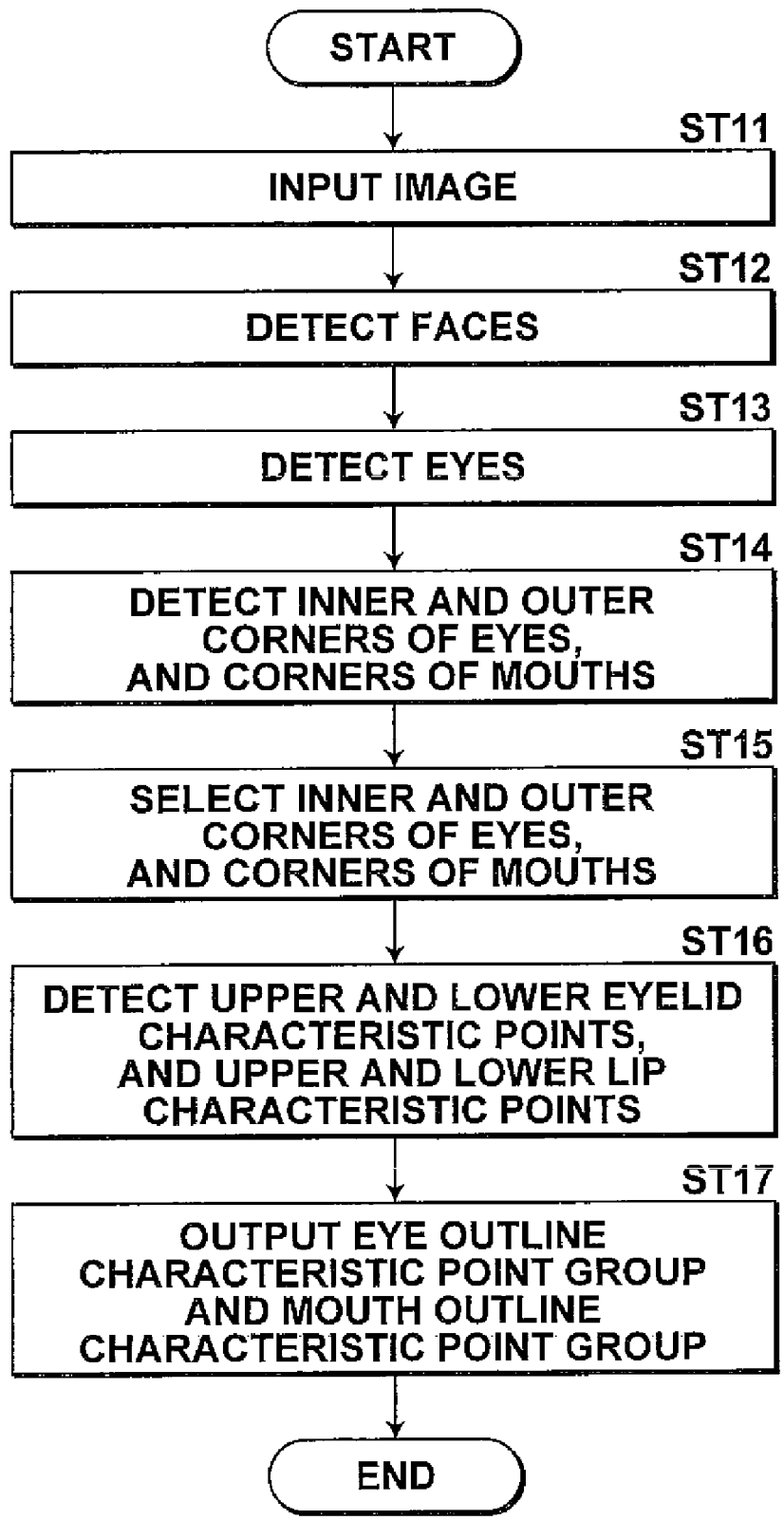

METHOD, APPARATUS, AND PROGRAM FOR DETECTING FACIAL CHARACTERISTIC POINTS

TECHNICAL FIELD

The present invention relates to a method, an apparatus, and a program for detecting facial characteristic points that represent outlines of eyes and mouths included in faces within images.

BACKGROUND ART

Detection of human faces from within images represented by image data is currently being performed in various fields, such as authentication employing facial characteristics and facial expression recognition. Further, the positions of parts that constitute faces and characteristic points that represent the outlines of the parts are also being detected, and various methods for doing so have been proposed.

For example, Japanese Unexamined Patent Publication No. 2005-108197 discloses a method for discriminating the positions of eyes within faces included in images. In this method, first, characteristic amounts of a discrimination target image are calculated. Then, first reference data is referred to, to discriminate whether the discrimination target image includes a face. The first reference data is obtained by learning characteristic amounts of a great number of images, which are known to be of faces and in which the positions of the eyes are normalized within a predetermined degree of tolerance, and images, which are known not to be of faces. In the case that a face is detected within the discrimination target image, second reference data is referred to, to discriminate the positions of eyes within the face. The second reference data is obtained by learning characteristic amounts of a great number of images, which are known to be of faces and in which the positions of the eyes are normalized with a degree of tolerance less than the predetermined degree of tolerance, and images, which are known not to be of faces. This method enables accurate and highly robust detection of faces and eyes included therein.

Japanese Unexamined Patent Publication No. 2005-056124 discloses a method for detecting the positions of specific parts of faces. In this method, first, a facial region is detected within an image. Then, template matching with respect to four directional features is performed to calculate initial similarities of the four directional features. A periphery matching probability that represents the relationship between a specific facial part and facial parts in the periphery of the specific facial part is obtained. The position of the specific facial part is detected by a relaxation matching method employing the initial similarities and the periphery matching probability. This method enables accurate detection of the positions of exposed facial parts, even in the case that a portion of the facial parts are partially or completely concealed.

Japanese Unexamined Patent Publication No. 2005-056231 discloses a method for detecting faces and constituent parts thereof. In this method, first, the position of a face or a portion thereof is roughly detected from within an input image. The detection results are displayed by a display section, and a user inputs whether the detection results are appropriate, based on the displayed detection results. When the user input indicates that the detection results are not appropriate, finer detection is executed to detect the position of the face or the portion thereof. This method enables detection and utilization of the positions of specific faces or constituent parts thereof at an accuracy suited to the input image.

In authentication employing facial characteristics, facial expression recognition and the like, it is necessary to accurately detect characteristic points that represent the outlines of facial parts, in addition to the central positions of the facial parts that constitute faces. Such characteristic points include the inner and outer corners of eyes and central points of upper and lower eyelids that represent the outlines of the eyes, and the right and left corners of mouths and central points of upper and lower lips that represent the outlines of the mouths.

The method disclosed in Japanese Unexamined Patent Publication No. 2005-108197 is accurate and highly robust. However, the detection targets are only faces and eyes included therein. This method is not capable of detecting characteristic points that represent the outlines of facial parts that constitute faces.

The method disclosed in Japanese Unexamined Patent Publication No. 2005-056124 is capable of detecting the central positions of facial parts that constitute faces. However, this method is not capable of detecting characteristic points that represent the outlines of the facial parts. In addition, because template matching is employed in this method, if lighting conditions during photography of images, which are targets of detection, differ greatly, there is a possibility that the detection accuracy will deteriorate.

The method disclosed in Japanese Unexamined Patent Publication No. 2005-056231 is capable of detecting characteristic points that represent the outlines of facial parts. However, it is presumed that users will manually input corrections in cases that appropriate detection results are not obtained. Therefore, accuracy and robustness are not guaranteed, and a burden is placed on the users.

The present invention has been developed in view of the foregoing circumstances. It is an object of the present invention to provide a method, an apparatus, and a program for detecting facial characteristic points with high accuracy and without placing a burden on users.

DISCLOSURE OF THE INVENTION

A facial characteristic point detecting method of the present invention comprises the steps of:

detecting a face included in an image, which is a target of detection;

detecting eyes within the detected face, employing the detection data obtained in the face detecting step;

detecting the inner and outer corners of the detected eyes, employing the detection data obtained in the eye detecting step; and detecting characteristic points of the upper and lower eyelids that represent the outline of the eyes, employing positional data of the inner and outer corners obtained in the inner and outer corner detecting step.

In the facial characteristic point detecting method of the present invention, detection of the characteristic points of the upper and lower eyelids may be performed by:

setting at least one eyelid reference line segment, corresponding to the characteristic points, that intersects a line segment that connects the detected inner and outer corners of a detected eye;

calculating characteristic amounts of one dimensional brightness distributions for discriminating the characteristic points, which are defined for the characteristic points corresponding to one of the at least one eyelid reference line segment, with respect to each pixel of the one eyelid reference line segment; and administering an eyelid characteristic point discriminating process, in which whether each of the pixels is a pixel that represents the characteristic point is discriminated, based on the brightness distribution; wherein the eyelid characteristic point discriminating process is administered with respect to all of the set eyelid reference line segments.

In this case, it is desirable for the eyelid characteristic point discriminating process to be performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points from within a plurality of sample images of faces.

In the facial characteristic point detecting method of the present invention, it is desirable for the face detecting step to comprise the steps of:

setting a mask image within the detection target image;

calculating first characteristic amounts to be employed in face discrimination from the mask image; and discriminating whether a face is included within the mask image by referring to first reference data, in which the first characteristic amounts and discriminating conditions corresponding thereto are defined, obtained in advance by learning the first characteristic amounts from a sample image group including a plurality of sample images, which are known to be of faces and in which positional relationships between the pairs of eyes are normalized with a predetermined degree of tolerance, and a plurality of sample images, which are known not to be of faces, with a machine learning method, while deforming the mask image in stepwise variations corresponding to the predetermined degree of tolerance;

the eye detecting step to comprise the steps of:

calculating second characteristic amounts to be employed in face discrimination from a detected facial region; and discriminating the positions of eyes included in the face by referring to second reference data, in which the second characteristic amounts and discriminating conditions corresponding thereto are defined, obtained in advance by learning the second characteristic amounts from a small tolerance sample image group including a plurality of sample images, which are known to be of faces and in which positional relationships between the pairs of eyes are normalized with a degree of tolerance smaller than the predetermined degree of tolerance, and a plurality of sample images, which are known not to be of faces, with a machine learning method, while deforming the image of the facial region in stepwise variations corresponding to the smaller degree of tolerance; and the inner and outer corner detecting step to comprise the steps of:

calculating third characteristic amounts to be employed in eye discrimination from a detected region that includes an eye; and discriminating the positions of the inner and outer corners of the eye by referring to third reference data, in which the third characteristic amounts and discriminating conditions corresponding thereto are defined, obtained in advance by learning the third characteristic amounts from a small tolerance sample image group including a plurality of sample images, which are known to be of eyes and in which positional relationships between the eyes and the inner and outer corners thereof are normalized with a degree of tolerance smaller than the predetermined degree of tolerance, and a plurality of sample images, which are known not to be of eyes, with a machine learning method, while deforming the image of the eye region in stepwise variations corresponding to the smaller degree of tolerance.

Here, the inner and outer corner detecting step may comprise the steps of:

referring to the third reference data, which has been obtained by performing learning employing sample images of only the left or right eye, based on the third characteristic amounts calculated from the image of the eye region, to discriminate the positions of the inner and outer corners of one of a right or left eye; and referring to the third reference data, based on the third characteristic amounts calculated from the image of the eye region, which has been inverted in the horizontal direction, to discriminate the positions of the inner and outer corners of the other of the right or left eye.

The facial characteristic point detecting method of the present invention may further comprise the steps of:

detecting the right and left corners of a mouth, which have predetermined positional relationships with the detected eyes, based on detection data obtained in the eye detecting step; and detecting characteristic points of the upper and lower lips that represent the outline of the mouth, employing positional data of the right and left corners obtained in the right and left corner detecting step.

In this case, detection of the characteristic points of the upper and lower lips may be performed by:

setting at least one lip reference line segment, corresponding to the characteristic points, that intersects a line segment that connects the detected right and left corners of a detected mouth;

calculating characteristic amounts of one dimensional brightness distributions for discriminating the characteristic points, which are defined for the characteristic points corresponding to one of the at least one lip reference line segment, with respect to each pixel of the one lip reference line segment; and administering a lip characteristic point discriminating process, in which whether each of the pixels is a pixel that represents the characteristic point is discriminated, based on the brightness distribution; wherein the lip characteristic point discriminating process is administered with respect to all of the set lip reference line segments.

Here, the lip characteristic point discriminating process may be performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points, from within a plurality of sample images of faces.

In addition, the right and left corner detecting step may comprise the steps of:

calculating fourth characteristic amounts to be employed in mouth discrimination from a detected region that includes a mouth; and discriminating the positions of the right and left corners of the mouth by referring to fourth reference data, in which the fourth characteristic amounts and discriminating conditions corresponding thereto are defined, obtained in advance by learning the fourth characteristic amounts from a small tolerance sample image group including a plurality of sample images, which are known to be of mouths and in which positional relationships between the right and left corners thereof are normalized with a degree of tolerance smaller than the predetermined degree of tolerance, and a plurality of sample images, which are known not to be of mouths, with a machine learning method, while deforming the image of the mouth region in stepwise variations corresponding to the smaller degree of tolerance.

A facial characteristic point detecting apparatus of the present invention comprises:

face detecting means for detecting a face included in an image, which is a target of detection;

eye detecting means for detecting eyes within the detected face, employing the detection data obtained by the face detecting means;

eye corner detecting means for detecting the inner and outer corners of the detected eyes, employing the detection data obtained by the eye detecting means; and eyelid characteristic point detecting means for detecting characteristic points of the upper and lower eyelids that represent the outline of the eyes, employing positional data of the inner and outer corners obtained by the eye corner detecting means.

In the facial characteristic point detecting apparatus of the present invention, the eyelid characteristic point detecting means may detect characteristic points of the upper and lower eyelids by:

setting at least one eyelid reference line segment, corresponding to the characteristic points, that intersects a line segment that connects the detected inner and outer corners of a detected eye;

calculating characteristic amounts of one dimensional brightness distributions for discriminating the characteristic points, which are defined for the characteristic points corresponding to one of the at least one eyelid reference line segment, with respect to each pixel of the one eyelid reference line segment; and administering an eyelid characteristic point discriminating process, in which whether each of the pixels is a pixel that represents the characteristic point is discriminated, based on the brightness distribution; wherein the eyelid characteristic point discriminating process is administered with respect to all of the set eyelid reference line segments.

In this case, it is desirable for the eyelid characteristic point discriminating process to be performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points from within a plurality of sample images of faces.

In the facial characteristic point detecting apparatus of the present invention, it is preferable for the face detecting means to comprise:

first characteristic amount calculating means for setting a mask image within the detection target image and calculating first characteristic amounts to be employed in face discrimination from the mask image; and first discriminating means for discriminating whether a face is included within the mask image by referring to first reference data, in which the first characteristic amounts and discriminating conditions corresponding thereto are defined, obtained in advance by learning the first characteristic amounts from a sample image group including a plurality of sample images, which are known to be of faces and in which positional relationships between the pairs of eyes are normalized with a predetermined degree of tolerance, and a plurality of sample images, which are known not to be of faces, with a machine learning method, while deforming the mask image in stepwise variations corresponding to the predetermined degree of tolerance;

the eye detecting means to comprise:

second characteristic amount calculating means for calculating second characteristic amounts to be employed in face discrimination from a detected facial region; and second discriminating means for discriminating the positions of eyes included in the face by referring to second reference data, in which the second characteristic amounts and discriminating conditions corresponding thereto are defined, obtained in advance by learning the second characteristic amounts from a small tolerance sample image group including a plurality of sample images, which are known to be of faces and in which positional relationships between the pairs of eyes are normalized with a degree of tolerance smaller than the predetermined degree of tolerance, and a plurality of sample images, which are known not to be of faces, with a machine learning method, while deforming the image of the facial region in stepwise variations corresponding to the smaller degree of tolerance; and the eye corner detecting means to comprise:

third characteristic amount calculating means for calculating third characteristic amounts to be employed in eye discrimination from a detected region that includes an eye; and third discriminating means for discriminating the positions of the inner and outer corners of the eye by referring to third reference data, in which the third characteristic amounts and discriminating conditions corresponding thereto are defined, obtained in advance by learning the third characteristic amounts from a small tolerance sample image group including a plurality of sample images, which are known to be of eyes and in which positional relationships between the eyes and the inner and outer corners thereof are normalized with a degree of tolerance smaller than the predetermined degree of tolerance, and a plurality of sample images, which are known not to be of eyes, with a machine learning method, while deforming the image of the eye region in stepwise variations corresponding to the smaller degree of tolerance.

Here, the eye corner detecting means may detect the inner and outer corners of the eye by:

referring to the third reference data, which has been obtained by performing learning employing sample images of only the left or right eye, based on the third characteristic amounts calculated from the image of the eye region, to discriminate the positions of the inner and outer corners of one of a right or left eye; and referring to the third reference data, based on the third characteristic amounts calculated from the image of the eye region, which has been inverted in the horizontal direction, to discriminate the positions of the inner and outer corners of the other of the right or left eye.

The facial characteristic point detecting apparatus of the present invention may further comprise:

mouth corner detecting means for detecting the right and left corners of a mouth, which have predetermined positional relationships with the detected eyes, based on detection data obtained by the eye detecting means; and lip characteristic detecting means for detecting characteristic points of the upper and lower lips that represent the outline of the mouth, employing positional data of the right and left corners obtained by the mouth corner detecting means.

In this case, the lip characteristic point detecting means may detect the characteristic points of the upper and lower lips by:

setting at least one lip reference line segment, corresponding to the characteristic points, that intersects a line segment that connects the detected right and left corners of a detected mouth;

calculating characteristic amounts of one dimensional brightness distributions for discriminating the characteristic points, which are defined for the characteristic points corresponding to one of the at least one lip reference line segment, with respect to each pixel of the one lip reference line segment; and administering a lip characteristic point discriminating process, in which whether each of the pixels is a pixel that represents the characteristic point is discriminated, based on the brightness distribution; wherein the lip characteristic point discriminating process is administered with respect to all of the set lip reference line segments.

Here, the lip characteristic point discriminating process may be performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points, from within a plurality of sample images of faces.

The mouth corner detecting means may comprise:

fourth characteristic amount calculating means for calculating fourth characteristic amounts to be employed in mouth discrimination from a detected region that includes a mouth; and fourth discriminating means for discriminating the positions of the right and left corners of the mouth by referring to fourth reference data, in which the fourth characteristic amounts and discriminating conditions corresponding thereto are defined, obtained in advance by learning the fourth characteristic amounts from a small tolerance sample image group including a plurality of sample images, which are known to be of mouths and in which positional relationships between the right and left corners thereof are normalized with a degree of tolerance smaller than the predetermined degree of tolerance, and a plurality of sample images, which are known not to be of mouths, with a machine learning method, while deforming the image of the mouth region in stepwise variations corresponding to the smaller degree of tolerance.

A program of the present invention is a program that causes a computer to function as a facial characteristic point detecting apparatus, comprising:

face detecting means for detecting a face included in an image, which is a target of detection;

eye detecting means for detecting eyes within the detected face, employing the detection data obtained by the face detecting means;

eye corner detecting means for detecting the inner and outer corners of the detected eyes, employing the detection data obtained by the eye detecting means; and eyelid characteristic point detecting means for detecting characteristic points of the upper and lower eyelids that represent the outline of the eyes, employing positional data of the inner and outer corners obtained by the eye corner detecting means.

In the program of the present invention, the eyelid characteristic point detecting means may detect characteristic points of the upper and lower eyelids by:

setting at least one eyelid reference line segment, corresponding to the characteristic points, that intersects a line segment that connects the detected inner and outer corners of a detected eye;

calculating characteristic amounts of one dimensional brightness distributions for discriminating the characteristic points, which are defined for the characteristic points corresponding to one of the at least one eyelid reference line segment, with respect to each pixel of the one eyelid reference line segment; and administering an eyelid characteristic point discriminating process, in which whether each of the pixels is a pixel that represents the characteristic point is discriminated, based on the brightness distribution; wherein the eyelid characteristic point discriminating process is administered with respect to all of the set eyelid reference line segments.

In this case, the eyelid characteristic point discriminating process may be performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points from within a plurality of sample images of faces.

In the program of the present invention, it is preferable for the face detecting means to comprise:

first characteristic amount calculating means for setting a mask image within the detection target image and calculating first characteristic amounts to be employed in face discrimination from the mask image; and first discriminating means for discriminating whether a face is included within the mask image by referring to first reference data, in which the first characteristic amounts and discriminating conditions corresponding thereto are defined, obtained in advance by learning the first characteristic amounts from a sample image group including a plurality of sample images, which are known to be of faces and in which positional relationships between the pairs of eyes are normalized with a predetermined degree of tolerance, and a plurality of sample images, which are known not to be of faces, with a machine learning method, while deforming the mask image in stepwise variations corresponding to the predetermined degree of tolerance;

the eye detecting means to comprise:

second characteristic amount calculating means for calculating second characteristic amounts to be employed in face discrimination from a detected facial region; and second discriminating means for discriminating the positions of eyes included in the face by referring to second reference data, in which the second characteristic amounts and discriminating conditions corresponding thereto are defined, obtained in advance by learning the second characteristic amounts from a small tolerance sample image group including a plurality of sample images, which are known to be of faces and in which positional relationships between the pairs of eyes are normalized with a degree of tolerance smaller than the predetermined degree of tolerance, and a plurality of sample images, which are known not to be of faces, with a machine learning method, while deforming the image of the facial region in stepwise variations corresponding to the smaller degree of tolerance; and the eye corner detecting means to comprise:

third characteristic amount calculating means for calculating third characteristic amounts to be employed in eye discrimination from a detected region that includes an eye; and third discriminating means for discriminating the positions of the inner and outer corners of the eye by referring to third reference data, in which the third characteristic amounts and discriminating conditions corresponding thereto are defined, obtained in advance by learning the third characteristic amounts from a small tolerance sample image group including a plurality of sample images, which are known to be of eyes and in which positional relationships between the eyes and the inner and outer corners thereof are normalized with a degree of tolerance smaller than the predetermined degree of tolerance, and a plurality of sample images, which are known not to be of eyes, with a machine learning method, while deforming the image of the eye region in stepwise variations corresponding to the smaller degree of tolerance.

Here, the eye corner detecting means may detect the inner and outer corners of the eye by:

referring to the third reference data, which has been obtained by performing learning employing sample images of only the left or right eye, based on the third characteristic amounts calculated from the image of the eye region, to discriminate the positions of the inner and outer corners of one of a right or left eye; and referring to the third reference data, based on the third characteristic amounts calculated from the image of the eye region, which has been inverted in the horizontal direction, to discriminate the positions of the inner and outer corners of the other of the right or left eye.

The program of the present invention may cause the computer to function as a facial characteristic point detecting apparatus further comprising:

mouth corner detecting means for detecting the right and left corners of a mouth, which have predetermined positional relationships with the detected eyes, based on detection data obtained by the eye detecting means; and lip characteristic detecting means for detecting characteristic points of the upper and lower lips that represent the outline of the mouth, employing positional data of the right and left corners obtained by the mouth corner detecting means.

In this case, the lip characteristic point detecting means may detect the characteristic points of the upper and lower lips by:

setting at least one lip reference line segment, corresponding to the characteristic points, that intersects a line segment that connects the detected right and left corners of a detected mouth;

calculating characteristic amounts of one dimensional brightness distributions for discriminating the characteristic points, which are defined for the characteristic points corresponding to one of the at least one lip reference line segment, with respect to each pixel of the one lip reference line segment; and administering a lip characteristic point discriminating process, in which whether each of the pixels is a pixel that represents the characteristic point is discriminated, based on the brightness distribution; wherein the lip characteristic point discriminating process is administered with respect to all of the set lip reference line segments.

Here, the lip characteristic point discriminating process may be performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points, from within a plurality of sample images of faces.

In addition, the mouth corner detecting means may comprise:

fourth characteristic amount calculating means for calculating fourth characteristic amounts to be employed in mouth discrimination from a detected region that includes a mouth; and fourth discriminating means for discriminating the positions of the right and left corners of the mouth by referring to fourth reference data, in which the fourth characteristic amounts and discriminating conditions corresponding thereto are defined, obtained in advance by learning the fourth characteristic amounts from a small tolerance sample image group including a plurality of sample images, which are known to be of mouths and in which positional relationships between the right and left corners thereof are normalized with a degree of tolerance smaller than the predetermined degree of tolerance, and a plurality of sample images, which are known not to be of mouths, with a machine learning method, while deforming the image of the mouth region in stepwise variations corresponding to the smaller degree of tolerance.

In the present invention, "detection data" refers to data regarding the position of a predetermined facial part with respect to the detection target image in which the predetermined facial part has been detected. The "detection data" may be data that represents the position of the center of the facial part region, the position of the center of gravity of the facial part region, the position of the outline of the facial part region, and the size of the facial part, for example.

In the present invention, the neural network method and the boosting method may be considered as the "machine learning method".

In the present invention, the phrase "characteristic amounts of brightness distributions" refers to brightness profiles and brightness profile differentials, for example. Note that it is preferable for the brightness profiles and brightness profile differentials to be polytomized.

The present invention is applicable to faces in profile and obliquely facing faces, in addition to human faces which are facing straight forward.

The facial characteristic point detecting method and the facial characteristic point detecting apparatus of the present invention first detects a face included in a detection target image. Detection data of the face is employed to detect eyes which are included in the face. Detection data of the eyes are employed to detect the inner and outer corners of the eyes. Detection data of the inner and outer corners of the eyes is employed to detect characteristic points of the upper and lower eyelids that represent the outline of the eyes. Thereby, the characteristic points that represent the outlines of the eyes can be efficiently and accurately detected according to a coarse to fine detection concept, without burdening users.

BRIEF DESCRIPTION OF THE DRAWINGS

FIGS. 5A and 5B illustrate edge detection filters, wherein FIG. 5A illustrates an edge detection filter for detecting horizontal edges, and FIG. 5B illustrates an edge detection filter for detecting vertical edges.

FIGS. 11A, 11B, and 11C are diagrams for explaining rotation of faces.

FIG. 12 is a flow chart that illustrates the learning technique for reference data employed to detect faces, eyes, inner and outer corners of eyes, corners of mouths, eyelid characteristic points, and lip characteristic points.

FIG. 23 is a flow chart that illustrates the processes performed by the facial characteristic point detecting apparatus of FIG. 1.

BEST MODE FOR CARRYING OUT THE INVENTION

Hereinafter, an embodiment of the present invention will be described with reference to the attached drawings.

Figure 1:
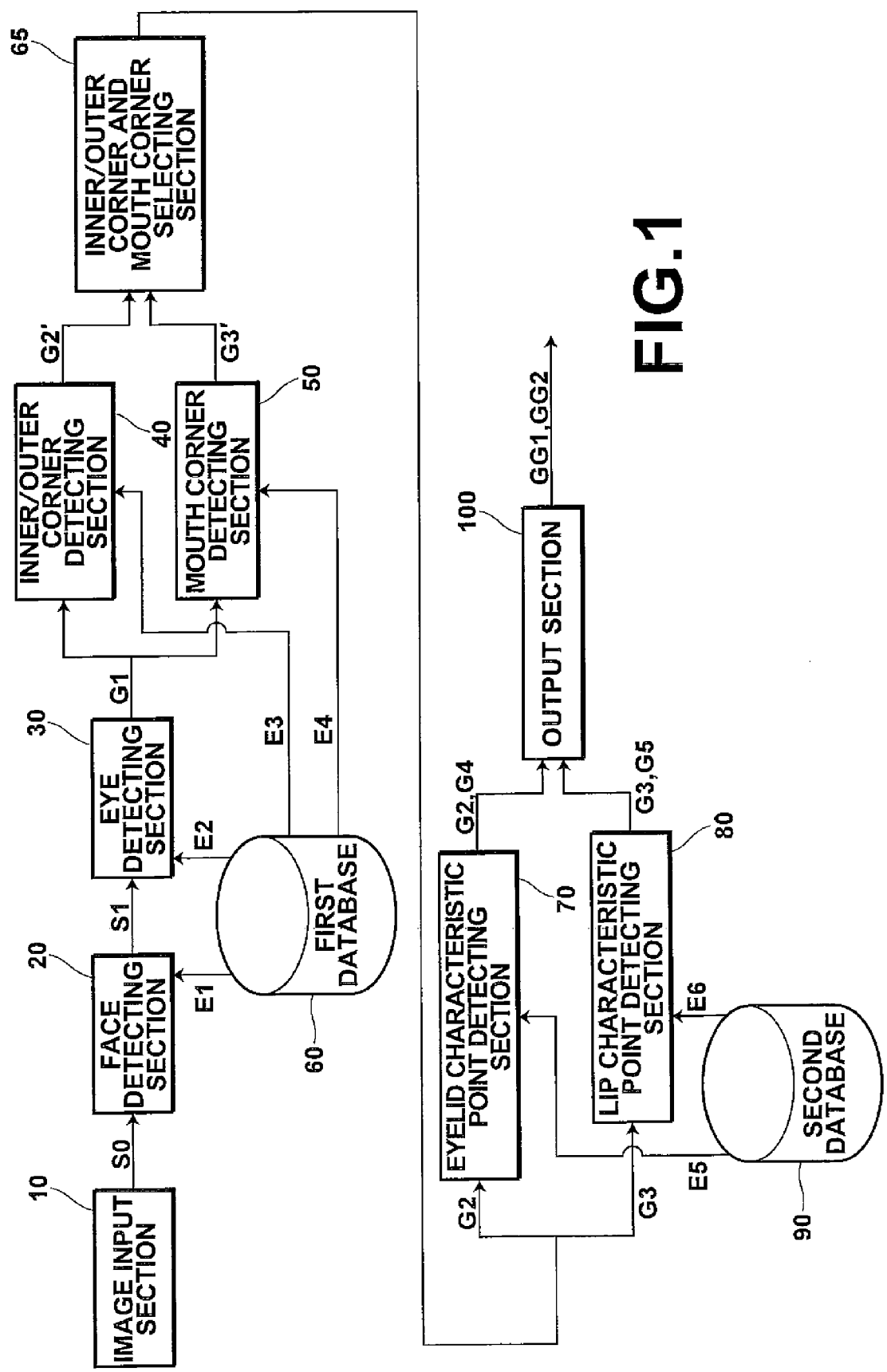
FIG. 1 is a block diagram that illustrates the construction of a facial characteristic point detecting apparatus according to an embodiment of the present invention.

FIG. 1 is a block diagram that illustrates the construction of a facial characteristic point detecting apparatus according to an embodiment of the present invention. Note that the facial characteristic point detecting apparatus according to the embodiment detects faces from input images, detects eyes based on positional data of the detected faces, detects the inner and outer corners of the eyes and the right and left corners of mouths based on positional data of the detected eyes, and finally detects characteristic points of eyelids that represent the outlines of the eyes and characteristic points of lips that represent the outlines of the mouths based on positional data of the detected inner and outer corners of the eyes and the right and left corners of the mouths. Note that the facial characteristic point detecting apparatus is realized by executing a program, which is read into an auxiliary memory device, on a computer (a personal computer, for example). The program is recorded in a data medium such as a CD-ROM, or distributed via a network such as the Internet, and installed in the computer.

Note that image data represents images, and the following description will be given without differentiating image data and images.

As illustrated in FIG. 1, the facial characteristic point detecting apparatus according to the embodiment comprises: an image input section 10, for inputting images S0 as processing objects; a face detecting section 20 for detecting faces from within the input images S0 and obtaining images S1 (hereinafter, referred to as "facial images S1") of the detected facial regions; an eye detecting section 30, for extracting true facial images S2 from among the facial images S1 and detecting the positions of eyes therein; an inner/outer corner detecting section 40, for detecting the inner and outer corners of each eye based on the detected positions of the eyes; a mouth corner detecting section 50, for estimating the positions of mouths based on the detected positions of the eyes and detecting the right and left corners of the mouths; a first database 60, for storing reference data E1 employed by the face detecting section 20, reference data E2 employed by the eye detecting section 30, reference data E3 employed by the inner/outer corner detecting section 40, and reference data E4 employed by the mouth corner detecting section 50 therein; an inner/outer corner and mouth corner selecting section 65, for selecting true inner and outer corners of eyes and true corners of mouths from among the detected inner and outer corners of the eyes and the detected corners of the mouths; an upper/lower eyelid characteristic point detecting section 70, for detecting characteristic points of upper and lower eyelids based on the positions of the inner and outer corners of the eyes; an upper/lower lip characteristic point detecting section 80, for detecting characteristic points of upper and lower lips based on the positions of the right and left corners of the mouths; a second database 90, for storing reference data E5 employed by the upper/lower eyelid characteristic point detecting section 70 and reference data E6 employed by the upper/lower lip characteristic point detecting section 80 therein; and an output section 100, for outputting the inner and outer corners of the eyes and the characteristic points of the upper and lower eyelids as a characteristic point group that represents the outlines of the eyes and outputting the right and left corners of the mouths and the characteristic points of the upper and lower lip as a characteristic point group that represents the outlines of the mouths.

The image input section 10 inputs processing object images S0 to the facial characteristic point detecting apparatus of the present embodiment. The image input section 10 may be a receiving section for receiving images transmitted via a network, a readout section for reading out the input images S0 from recording media such as CD-ROM's, or a scanner for reading out the input images S0 by photoelectric conversion from images which have been printed on printing media such as paper and from photographic prints.

Figure 2:
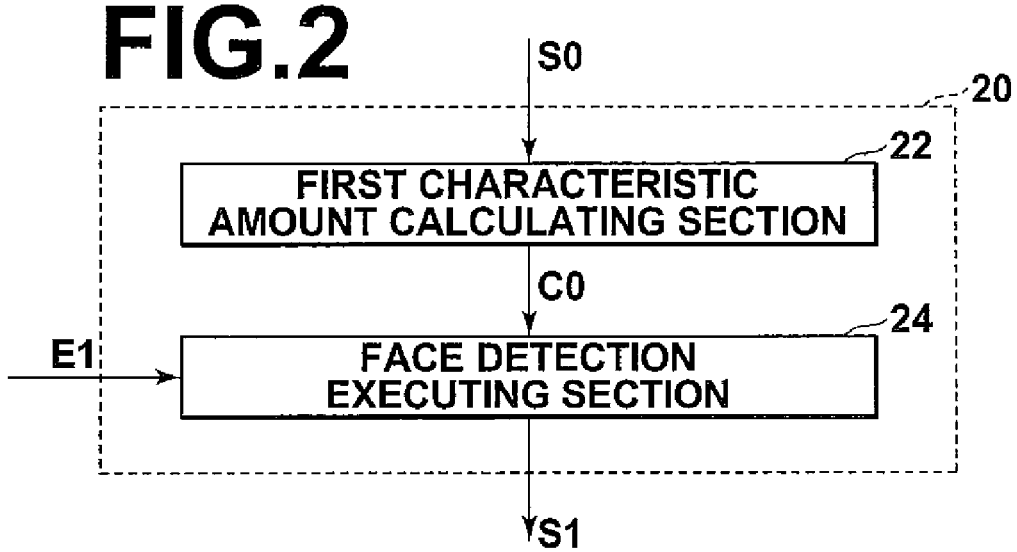
FIG. 2 is a block diagram that illustrates the construction of a face detecting section 20 of the facial characteristic point detecting apparatus of FIG. 1.

FIG. 2 is a block diagram that illustrates the construction of the face detecting section 20 of the facial characteristic point detecting apparatus of FIG. 1. The face detecting section 20 detects whether faces are included in input images S0, and detects the approximate positions and sizes of faces in the case that faces are included. The face detecting section 20 obtains facial images S1 by extracting images corresponding to the positions and sizes of the faces from within the input images S0. As illustrated in FIG. 2, the face detecting section 20 comprises: a first characteristic amount calculating section 22 for calculating characteristic amounts C0 within the input image S0; and a face detection executing section 24 for executing face detection employing the characteristic amounts C0 and the reference data E1 stored in the first database 60. Here, the reference data E1 stored in the first database 60 and the components of the face detecting section 20 will be described.

Figures 5A, 5B:
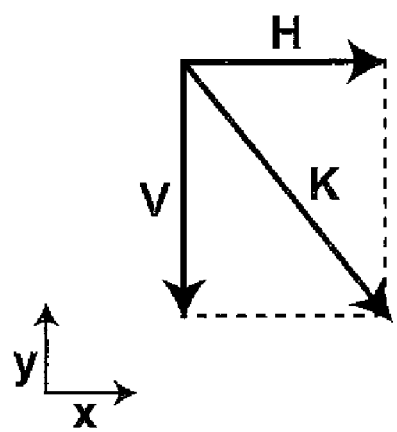
Figure 6:
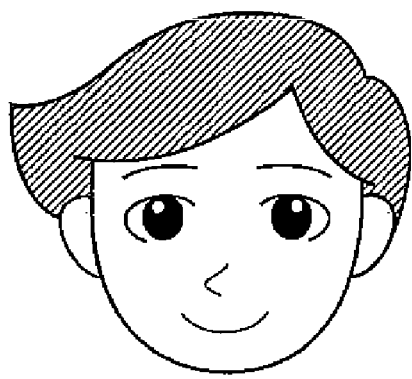
FIG. 6 is a diagram for explaining calculation of gradient vectors.

The first characteristic amount calculating section 22 of the face detecting section 20 calculates characteristic amounts C0 employed to discriminate faces from within the input images S0. Specifically, gradient vectors (the direction and magnitude of density change at each pixel within the input images S0) are calculated as the characteristic amounts C0. Hereinafter, calculation of the gradient vectors will be described. First, the first characteristic amount calculating section 22 detects edges in the horizontal direction within a input image S0, by administering a filtering process with a horizontal edge detecting filter, as illustrated in FIG. 5A. The first characteristic amount calculating section 22 also detects edges in the vertical direction within the input image S0, by administering a filtering process with a vertical edge detecting filter, as illustrated in FIG. 5B. Then, gradient vectors K for each pixel of the input image S0 are calculated from the size H of horizontal edges and the size V of the vertical edges, as illustrated in FIG. 6.

Figures 7A, 7B:
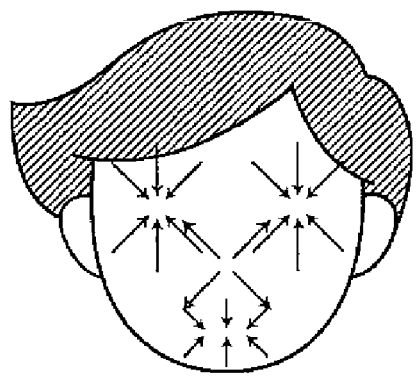
FIG. 7A illustrates a human face.
FIG. 7B illustrates gradient vectors in the vicinities of the eyes and the mouth within the human face.

In the case of a human face, such as that illustrated in FIG. 7A, the gradient vectors K, which are calculated in the manner described above, are directed toward the centers of eyes and mouths, which are dark, and are directed away from noses, which are bright, as illustrated in FIG. 7B. In addition, the magnitudes of the gradient vectors K are greater for the eyes than for the mouth, because changes in density are greater for the eyes than for the mouth.

The directions and magnitudes of the gradient vectors K are designated as the characteristic amounts C0. Note that the directions of the gradient vectors K are values between 0 and 359, representing the angle of the gradient vectors K from a predetermined direction (the x-direction in FIG. 6, for example).

Figure 8A:
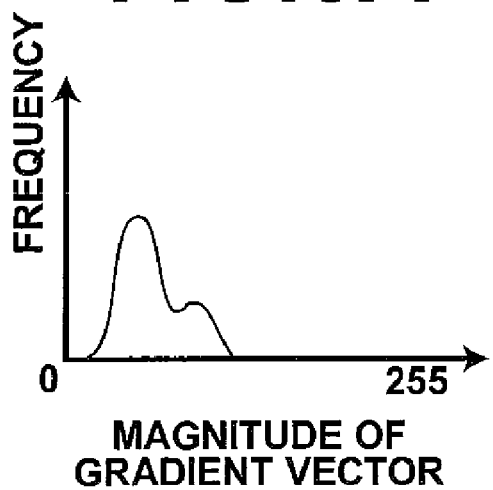
FIG. 8A illustrates a histogram that represents magnitudes of gradient vectors prior to normalization.
Figure 8B:
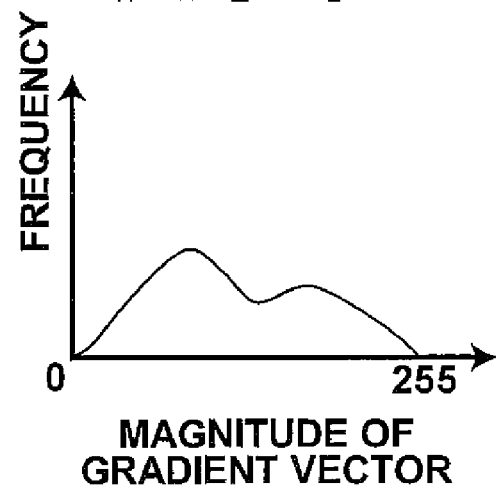
FIG. 8B illustrates a histogram that represents magnitudes of gradient vectors following normalization.
Figure 8C:
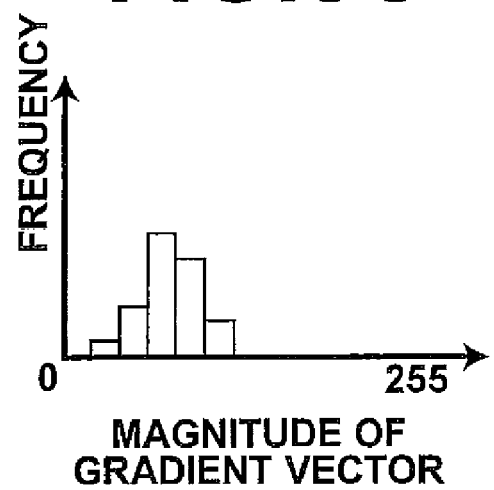
FIG. 8C illustrates a histogram that represents magnitudes of gradient vectors, which has been divided into five regions.
Figure 8D:
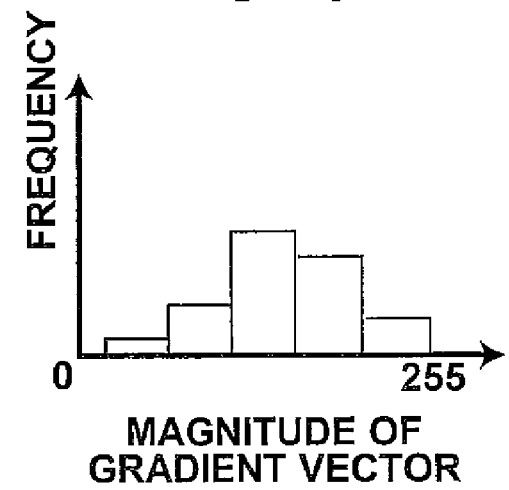
FIG. 8D illustrates a histogram that represents normalized magnitudes of gradient vectors, which has been divided into five regions.

Here, the magnitudes of the gradient vectors K are normalized. The normalization is performed in the following manner. First, a histogram that represents the magnitudes of the gradient vectors K of all of the pixels within the input image S0 is derived. Then, the magnitudes of the gradient vectors K are corrected, by flattening the histogram so that the distribution of the magnitudes is evenly distributed across the range of values assumable by each pixel of the candidate image (0 through 255 in the case that the image data is 8 bit data). For example, in the case that the magnitudes of the gradient vectors K are small and concentrated at the low value side of the histogram, as illustrated in FIG. 8A, the histogram is redistributed so that the magnitudes are distributed across the entire range from 0 through 255, as illustrated in FIG. 8B. Note that in order to reduce the amount of calculations, it is preferable that the distribution range of the gradient vectors K in a histogram be divided into five, for example, as illustrated in FIG. 8C. Then, the gradient vectors K are normalized by redistributing the histogram such that the frequency distribution, which has been divided into five, is distributed across the entire range of values from 0 through 255, as illustrated in FIG. 8D.

The reference data E1, which is stored in the first database 60, defines discriminating conditions for combinations of the characteristic amounts C0 for each pixel of each of a plurality of types of pixel groups, which are constituted by a plurality of pixels selected from sample images, to be described later.

The combinations of the characteristic amounts C0 and the discriminating conditions within the reference data E1 are set in advance by learning. The learning is performed by employing a sample image group comprising a plurality of sample images, which are known to be of faces, and a plurality of sample images, which are known to not be of faces.

Figure 9:
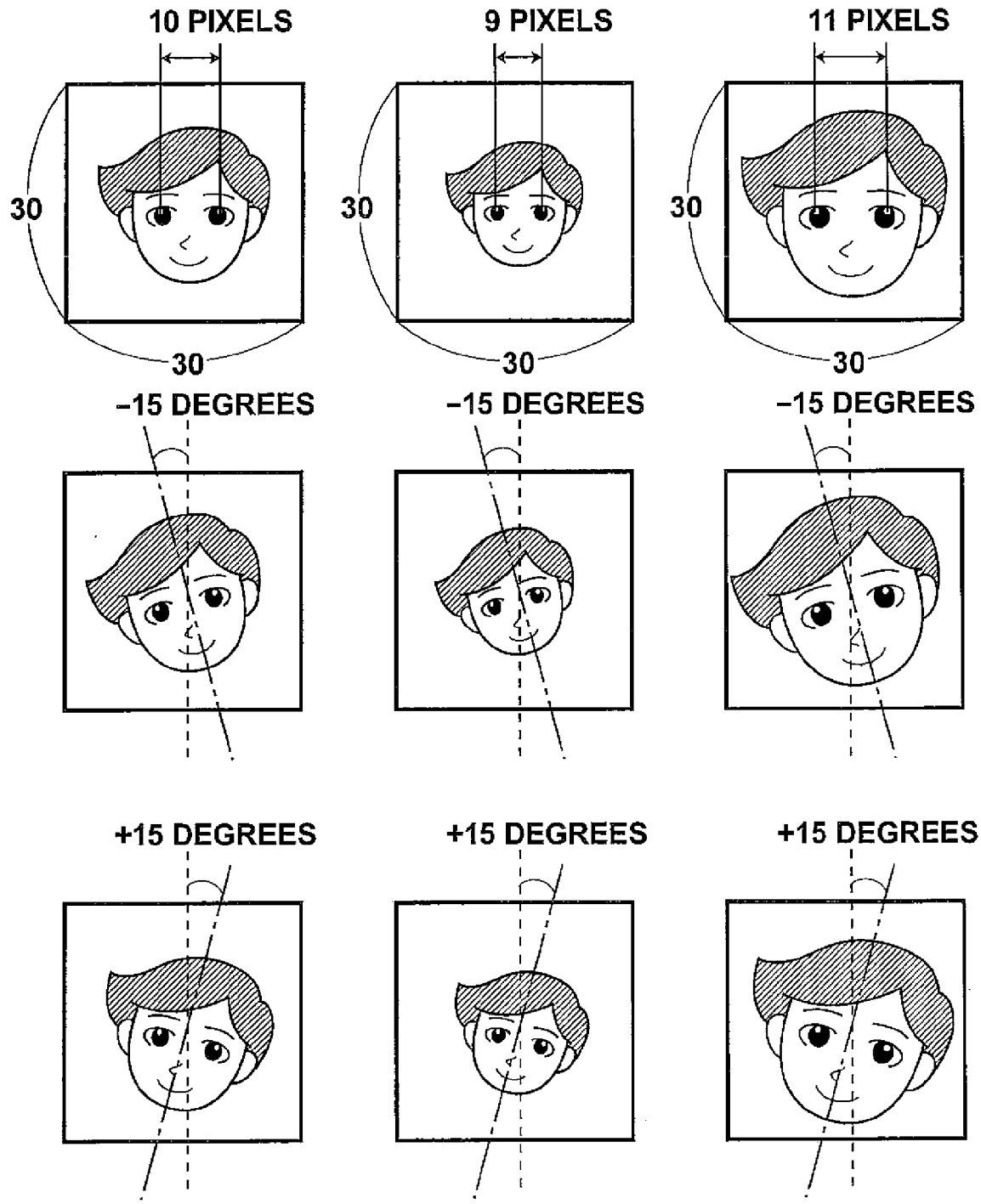
FIG. 9 illustrates examples of sample images, which are known to be of faces, employed during learning of reference data E1.

Note that in the present embodiment, the sample imaaes, which are known to be of faces and are utilized to generate the reference data E1, have the following specifications. That is, the sample images are of a 30×30 pixel size, the distances between the centers of the eyes of each face within the images are one of 9, 10, or 11 pixels, and the faces are rotated stepwise in three degree increments within a range of ±15 degrees from the vertical (that is, the rotational angles are −15 degrees, −12 degrees, −9 degrees, −6 degrees, 0 degrees, 3 degrees, 6 degrees, 9 degrees, 12 degrees, and 15 degrees). Accordingly, 33 sample images (3×11) are prepared for each face. Note that only sample images which are rotated −15 degrees, 0 degrees, and 15 degrees are illustrated in FIG. 9. The centers of rotation are the intersections of the diagonals of the sample images. Here, if the distance between the eyes is 10 pixels in the sample images, then the central positions of the eyes are all the same. The central positions of the eyes are designated as (x1, y1) and (x2, y2) on a coordinate plane having the upper left corner of the sample image as its origin. The positions of the eyes in the vertical direction (that is, y1 and y2) are the same for all of the sample images.

Arbitrary images of a 30×30 pixel size are employed as the sample images which are known to not be of faces.

Consider a case in which sample images, in which the distance between the eyes are 10 pixels and the rotational angle is 0 degrees (that is, the faces are in the vertical orientation), are employed exclusively to perform learning. In this case, only those faces, in which the distance between the eyes are 10 pixels and which are not rotated at all, would be discriminated by referring to the reference data E1. The sizes of the faces, which are possibly included in the input images S0, are not uniform in size. Therefore, during discrimination regarding whether a face is included in the photograph, the input image S0 is enlarged/reduced, to enable discrimination of a face of a size that matches that of the sample images. However, in order to maintain the distance between the centers of the eyes accurately at ten pixels, it is necessary to enlarge and reduce the input image S0 in a stepwise manner with magnification rates in 1.1 units, thereby causing the amount of calculations to be great.

In addition, faces, which are possibly included in the input images S0, are not only those which have rotational angles of 0 degrees, as that illustrated in FIG. 10A. There are cases in which the faces in the photographs are rotated, as illustrated in FIG. 10B and FIG. 10C. However, in the case that only sample images, in which the distance between the eyes are 10 pixels and the rotational angle is 0 degrees, are employed exclusively to perform learning, rotated faces such as those illustrated in FIG. 10B and FIG. 10C would not be discriminated as faces.

For these reasons, the present embodiment imparts a degree of tolerance to the reference data E1. This is accomplished by employing sample images, which are known to be of faces, in which the distances between the centers of the eyes are 9, 10, and 11 pixels, and which are rotated in a stepwise manner in three degree increments within a range of ±15 degrees. Thereby, the input image S0 may be enlarged/reduced in a stepwise manner with magnification rates in 11/9 units, which enables reduction of the time required for calculations, compared to a case in which the input image S0 is enlarged/reduced with magnification rates in 1.1 units. In addition, rotated faces, such as those illustrated in FIG. 10B and FIG. 10C, are also enabled to be discriminated.

Hereinafter, an example of a learning technique employing the sample images will be described with reference to the flow chart of FIG. 12.

The sample images, which are the subject of learning, comprise a plurality of sample images, which are known to be of faces, and a plurality of sample images, which are known to not be of faces. Note that the in sample images, which are known to be of faces, the distances between the centers of the eyes of each face within the images are one of 9, 10, or 11 pixels, and the faces are rotated stepwise in three degree increments within a range of ±15 degrees from the vertical. Each sample image is weighted, that is, is assigned a level of importance. First, the initial values of weighting of all of the sample images are set equally to 1 (step ST1).

Next, discriminators are generated for each of the different types of pixel groups of the sample images (step ST2). Here, each discriminator has a function of providing a reference to discriminate images of faces from those not of faces, by employing combinations of the characteristic amounts C0, for each pixel that constitutes a single pixel group. In the present embodiment, histograms of combinations of the characteristic amounts C0 for each pixel that constitutes a single pixel group are utilized as the discriminators.

Figure 13:
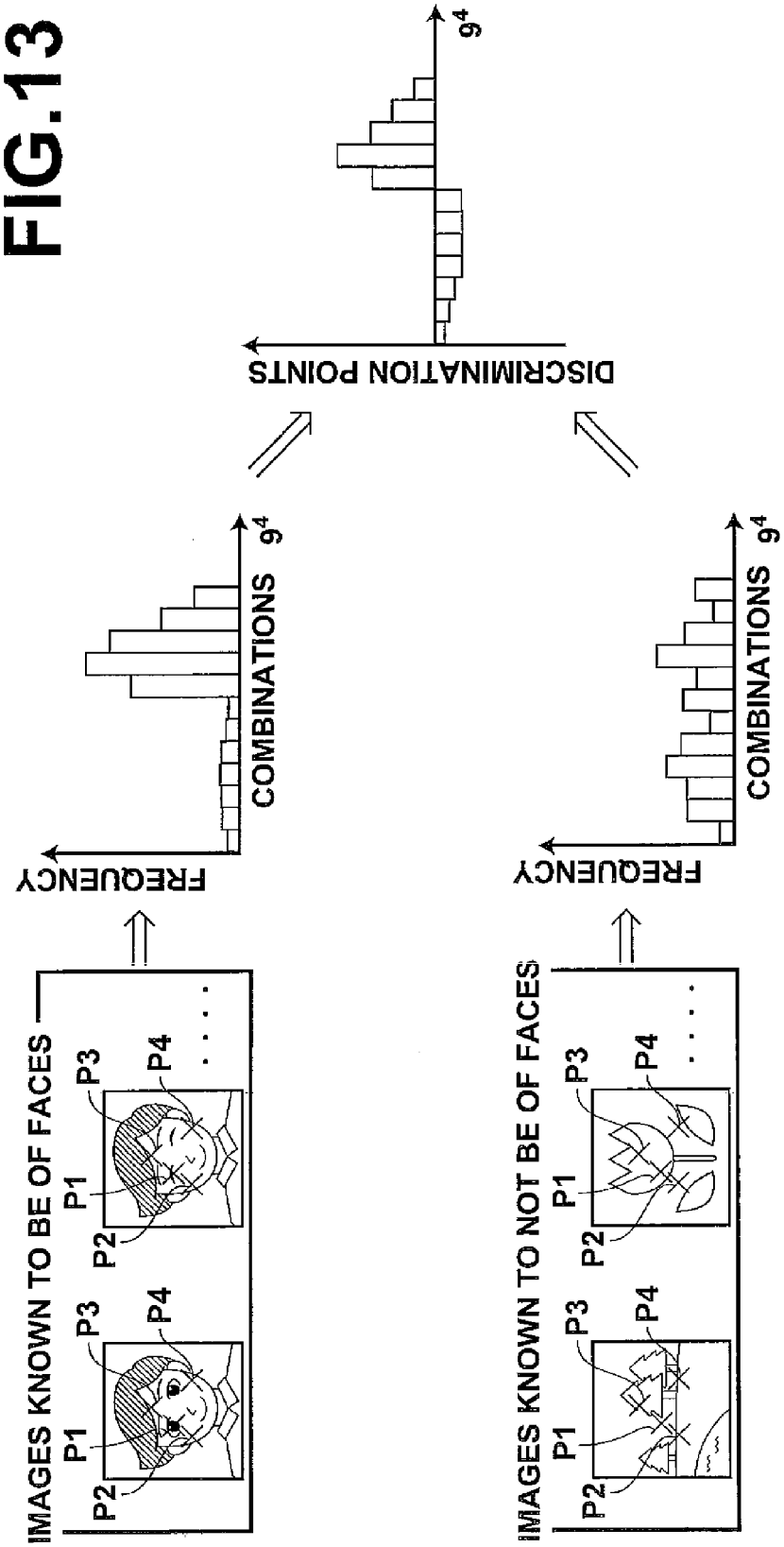
FIG. 13 illustrates a technique for selecting discriminators.

The generation of a discriminator will be described with reference to FIG. 13. As illustrated in the sample images at the left side of FIG. 13, the pixels that constitute the pixel group for generating the discriminator are: a pixel P1 at the center of the right eye; a pixel P2 within the right cheek; a pixel P3 within the forehead; and a pixel P4 within the left cheek, of the sample images which are known to be of faces. Combinations of the characteristic amounts C0 of the pixels P1 through P4 are obtained for all of the sample images, which are known to be of faces, and histograms thereof are generated. Here, the characteristic amounts C0 represent the directions and magnitudes of the gradient vectors K. However, there are 360 possible values (0 through 359) for the direction of the gradient vector K, and 256 possible values (0 through 255) for the magnitude thereof. If these values are employed as they are, the number of combinations would be four pixels at 360×256 per pixel, or $(360 \times 256)^4$, which would require a great number of samples, time, and memory for learning and detection. For this reason, in the present embodiment, the directions of the gradient vectors K are quaternarized, that is, set so that: values of 0 through 44 and 315 through 359 are converted to a value of 0 (right direction); values of 45 through 134 are converted to a value of 1 (upper direction); values of 135 through 224 are converted to a value of 2 (left direction); and values of 225 through 314 are converted to a value of 3 (lower direction). The magnitudes of the gradient vectors K are ternarized so that their values assume one of three values, 0 through 2. Then, the values of the combinations are calculated employing the following formulas.

Value of Combination=0 (in the case that the magnitude of the gradient vector is 0); and Value of Combination=(direction of the gradient vector+1)×magnitude of the gradient vector (in the case that the magnitude of the gradient vector>0).

Due to the above quaternarization and ternarization, the possible number of combinations becomes $9^4$, thereby reducing the amount of data of the characteristic amounts C0.

In a similar manner, histograms are generated for the plurality of sample images, which are known to not be of faces. Note that in the sample images, which are known to not be of faces, pixels (denoted by the same reference numerals P1 through P4) at positions corresponding to the pixels P1 through P4 of the sample images, which are known to be of faces, are employed in the calculation of the characteristic amounts C0. Logarithms of the ratios of the frequencies in the two histograms are represented by the rightmost histogram illustrated in FIG. 13, which is employed as the discriminator. According to the discriminator, images that have distributions of the characteristic amounts C0 corresponding to positive discrimination points therein are highly likely to be of faces. The likelihood that an image is of a face increases with an increase in the absolute values of the discrimination points. On the other hand, images that have distributions of the characteristic amounts C0 corresponding to negative discrimination points of the discriminator are highly likely to not be of faces. Again, the likelihood that an image is not of a face increases with an increase in the absolute values of the negative discrimination points. A plurality of discriminators are generated in histogram format regarding combinations of the characteristic amounts C0 of each pixel of the plurality of types of pixel groups, which are utilized during discrimination, in step ST2.

Thereafter, a discriminator, which is most effective in discriminating whether an image is of a face, is selected from the plurality of discriminators generated in step ST2. The selection of the most effective discriminator is performed while taking the weighting of each sample image into consideration. In this example, the percentages of correct discriminations provided by each of the discriminators are compared, and the discriminator having the highest weighted percentage of correct discriminations is selected (step ST3). At the first step ST3, all of the weighting of the sample images are equal, at 1. Therefore, the discriminator that correctly discriminates whether sample images are of faces with the highest frequency is selected as the most effective discriminator. On the other hand, the weightings of each of the sample images are renewed at step ST5, to be described later. Thereafter, the process returns to step ST3. Therefore, at the second step ST3, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step ST3's, more importance is placed on correctly discriminating heavily weighted sample images than lightly weighted sample images.

Next, confirmation is made regarding whether the percentage of correct discriminations of a combination of the discriminators which have been selected exceeds a predetermined threshold value (step ST4). That is, the percentage of discrimination results regarding whether sample images are of faces, which are obtained by the combination of the selected discriminators, that match the actual sample images is compared against the predetermined threshold value. Here, the sample images, which are employed in the evaluation of the percentage of correct discriminations, may be those that are weighted with different values, or those that are equally weighted. In case that the percentage of correct discriminations exceeds the predetermined threshold value, whether an image is of a face can be discriminated by the selected discriminators with sufficiently high accuracy, therefore the learning process is completed. In the case that the percentage of correct discriminations is less than or equal to the predetermined threshold value, the process proceeds to step ST6, to select an additional discriminator, to be employed in combination with the discriminators which have been selected thus far.

The discriminator, which has been selected at the immediately preceding step ST3, is excluded from selection in step ST6, so that it is not selected again.

Next, the weighting of sample images, which were not correctly discriminated by the discriminator selected at the immediately preceding step ST3, is increased, and the weighting of sample images, which were correctly discriminated, is decreased (step ST5). The reason for increasing and decreasing the weighting in this manner is to place more importance on images which were not correctly discriminated by the discriminators that have been selected thus far. In this manner, selection of a discriminator which is capable of correctly discriminating whether these sample images are of a face is encouraged, thereby improving the effect of the combination of discriminators.

Thereafter, the process returns to step ST3, and another effective discriminator is selected, using the weighted percentages of correct discriminations as a reference.

The above steps ST3 through ST6 are repeated to select discriminators corresponding to combinations of the characteristic amounts C0 for each pixel that constitutes specific pixel groups, which are suited for discriminating whether faces are included in images. If the percentages of correct discriminations, which are evaluated at step ST4, exceed the threshold value, the type of discriminator and discriminating conditions, which are to be employed in discrimination regarding whether images include faces, are determined (step ST7), and the learning of the reference data E1 is completed.

Note that in the case that the learning technique described above is applied, the discriminators are not limited to those in the histogram format. The discriminators may be of any format, as long as they provide references to discriminate between images of faces and other images by employing combinations of the first characteristic amounts E1 of each pixel that constitutes specific pixel groups. Examples of alternative discriminators are: binary data, threshold values, functions, and the like. As a further alternative, a histogram that represents the distribution of difference values between the two histograms illustrated in the center of FIG. 13 may be employed, in the case that the discriminators are of the histogram format.

The learning technique is not limited to that which has been described above. Other machine learning techniques, such as a neural network technique, may be employed.

The facial detection executing section 24 refers to the discriminating conditions of the reference data E1, which has been learned regarding every combination of the characteristic amounts C0 of each pixel that constitutes a plurality of types of pixel groups. Thereby, discrimination points of the combinations of the characteristic amounts C0 of each pixel that constitutes each of the pixel groups are obtained. A face is detected from the input image S0 by totaling the discrimination points. At this time, of the characteristic amounts C0, the directions of the gradient vectors K are quaternarized, and the magnitudes of the gradient vectors K are ternarized. In the present embodiment, detection is performed based on the magnitude of the sum of all of the discrimination points, and whether the sum is positive or negative. For example, in the case that the total sum of the discrimination points is positive, it is judged that a face is included in the input image S0. In the case that the total sum of the discrimination points is negative, it is judged that a face is not included in the input image S0.

Figure 14:
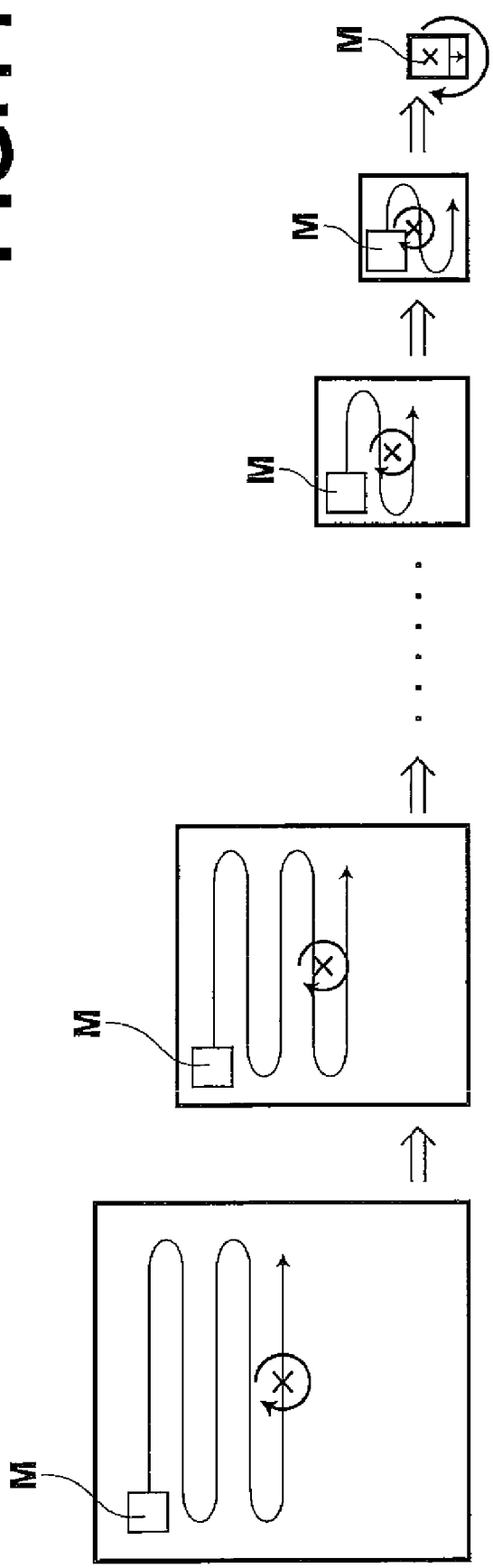
FIG. 14 is a diagram for explaining stepwise deformation of discrimination target images.

Here, the sizes of the input images S0 are varied, unlike the sample images, which are 30×30 pixels. In addition, in the case that a face is included in the input image S0, the face is not necessarily in the vertical orientation. For these reasons, the facial detection executing section 22 enlarges/reduces the input image S0 in a stepwise manner (FIG. 14 illustrates a reduction process) so that the size thereof becomes 30 pixels in either the vertical or horizontal direction. In addition, the input image S0 is rotated in a stepwise manner over 360 degrees. A mask M, which is 30×30 pixels large, is set on the input image S0, at every stepwise increment of the enlargement/reduction. The mask M is moved one pixel at a time on the input image S0, and whether a face is included in the input image S0 is discriminated, by discriminating whether the image within the mask is that of a face (that is, whether the sum of the discrimination points obtained from the image within the mask M is positive or negative). The discrimination is performed at each step of magnification/reduction and rotation of the input image S0. 30×30 pixel size regions corresponding to the positions of the mask M and the angles of rotation at which positive values are obtained for the sum of the discrimination points are detected as facial regions. The facial regions are extracted from the input image S0 as the facial images S1. Note that in the case that the sums of the discrimination points are negative at every stepwise increment, it is judged that no faces are included within the input image S0, and the process ends.

Note that during learning of the reference data E1, sample images are utilized, in which the distances between the centers of the eyes are one of 9, 10, and 11 pixels. Therefore, the magnification rate during enlargement/reduction of the input images S0 may be set to be 11/9. In addition, during learning of the reference data E1, sample images are utilized, in which faces are rotated within a range of ±15 degrees. Therefore, the input images S0 may be rotated over 360 degrees in 30 degree increments.

Here, the first characteristic amount calculating section 22 calculates the characteristic amounts C0 from the input images S0 at each step of their stepwise enlargement/reduction and rotational deformation.

The face detecting section 20 detects the approximate positions and sizes of faces from within the input images S0 and obtains the facial images S1 in this manner. Note that the face detecting section 20 judges that faces are included in the input images S0 if the sums of the discrimination points are positive. Therefore, the face detecting section 20 may obtain a plurality of facial images S1 from within a single input image S0.

Figure 3:
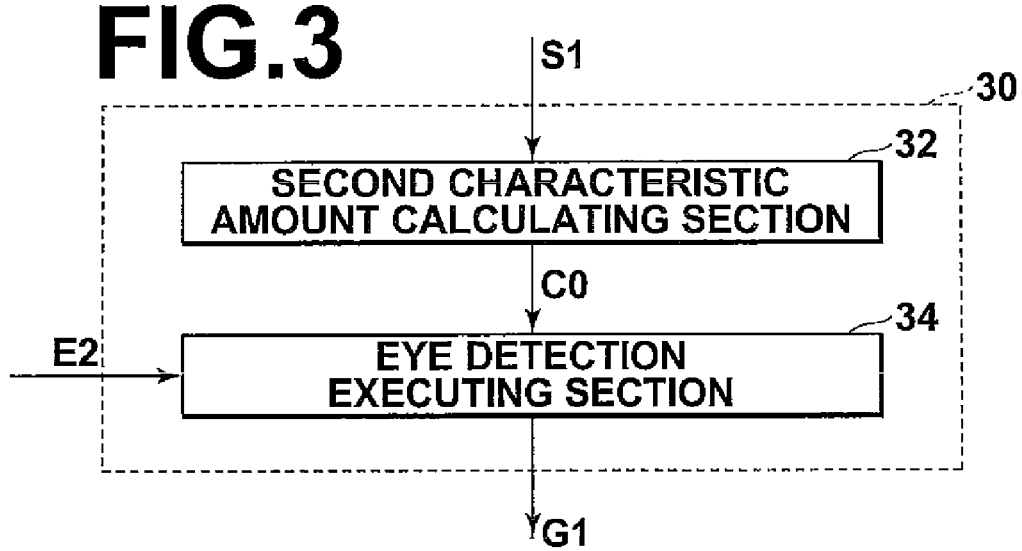
FIG. 3 is a block diagram that illustrates the construction of an eye detecting section 30 of the facial characteristic point detecting apparatus of FIG. 1.

FIG. 3 is a block diagram that illustrates the construction of the eye detecting section 30. The eye detecting section 30 detects the positions of eyes within the facial images S1 obtained by the face detecting section 20, by obtaining true facial images S2 from among the facial images S1. As illustrated in FIG. 3, the eye detecting section 30 comprises: a second characteristic amount calculating section 32, for calculating characteristic amounts C0 from the facial images S1; and an eye detection executing section 34, for executing detection of the positions of eyes, based on the characteristic amounts C0 and the reference data E2 recorded in the first database 60, and obtaining positional data G1 of the eyes.

Figure 4A:
FIGS. 4A and 4B are diagrams for explaining the central positions of eyes.
Figure 4B:

In the present embodiment, the positions of the eyes detected by the eye detection executing section 34 are the centers of the corners of the eyes (indicated by X's in FIGS. 4A and 4B). In the case that the eyes are looking forward, as illustrated in FIG. 4A, the centers are the irises. In the case that the eyes are looking toward the right, as illustrated in FIG. 45, the centers are not the irises, but the whites of the eyes.

The second characteristic amount calculating section 32 is the same as the first characteristic amount calculating section 22 of the face detecting section 20, except that the characteristic amounts C0 are calculated from the facial images S1 and not the input images S0. Therefore, a detailed description thereof will be omitted.

The second reference data E2 recorded in the first database 60 define discriminating conditions for combinations of the characteristic amounts C0 for each pixel of each of a plurality of types of pixel groups, which are constituted by a plurality of pixels selected from sample images, to be described later.

Figure 10:
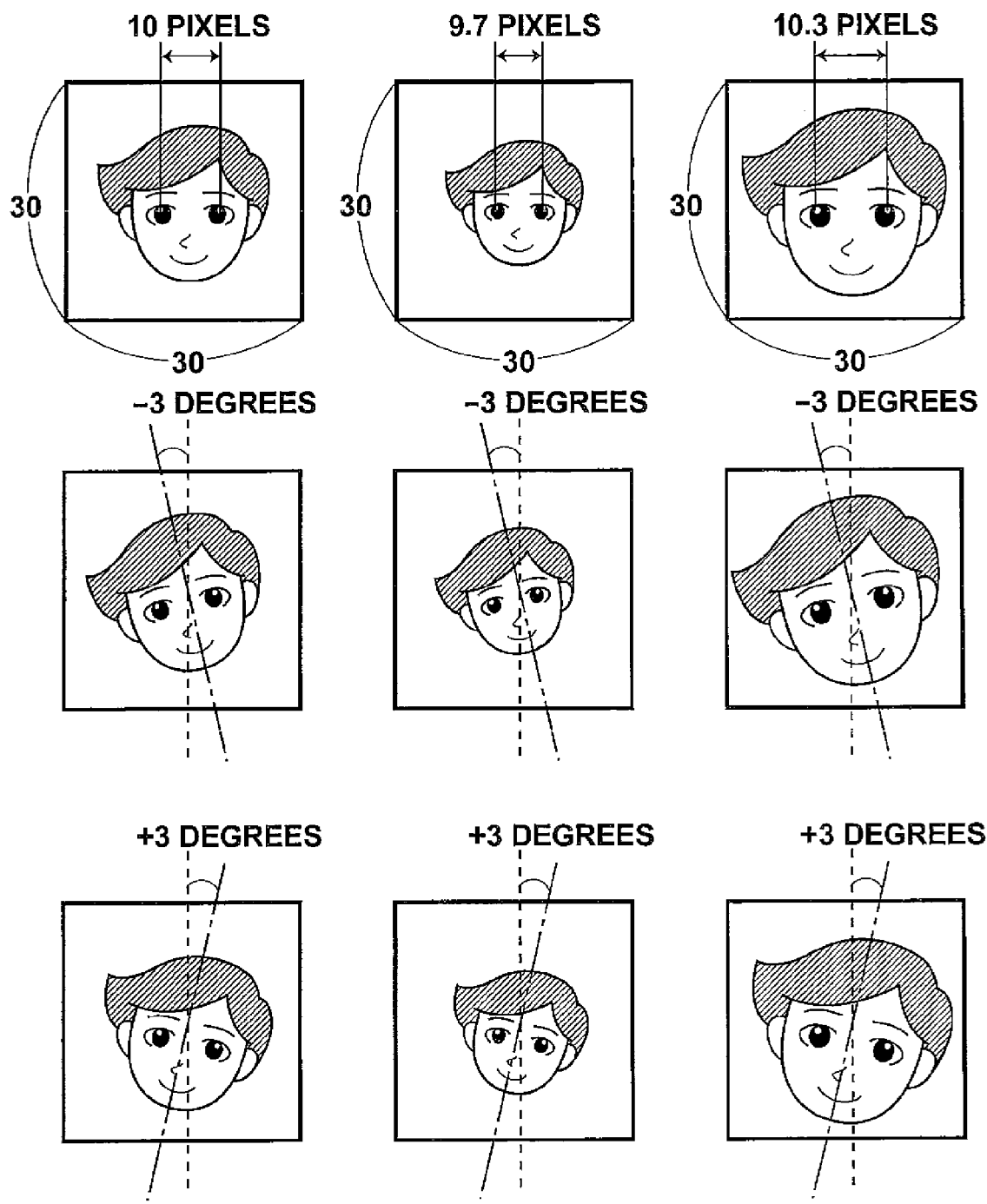
FIG. 10 illustrates examples of sample images, which are known to be of faces, employed during learning of reference data E2.

The sample images, which are employed during generation of the second reference data E2 and are known to be of faces, have the following specifications, as illustrated in FIG. 10. That is, the distances between the centers of the eyes of each face within the images are one of 9.7, 10, and 10.3 pixels, and each of the faces is rotated at one degree intervals within a range ±3 degrees from the vertical. Therefore, the degree of tolerance of the second reference data E2 is narrower than that of the reference data E1, thereby enabling accurate detection of the positions of the eyes. Note that the learning performed to generate the second reference data E2 is the same as that performed to generate the first reference data E1, except that the sample image groups are different between the two. Therefore, a detailed description thereof will be omitted.

The eye detection executing section 34 refers to the discriminating conditions of the reference data E2, which has been learned regarding every combination of the characteristic amounts C0 of each pixel that constitutes a plurality of types of pixel groups. Thereby, discrimination points of the combinations of the characteristic amounts C0 of each pixel that constitutes each of the pixel groups are obtained. The positions of eyes included in faces are detected by totaling the discrimination points. At this time, of the characteristic amounts C0, the directions of the gradient vectors K are quaternarized, and the magnitudes of the gradient vectors K are ternarized.

Here, the eye detection executing section 34 enlarges/reduces the facial images S1 in a stepwise manner. In addition, the facial images S1 are rotated in a stepwise manner over 360 degrees. A mask M, which is 30×30 pixels large, is set on the facial images S1, at every stepwise increment of the enlargement/reduction. The mask M is moved one pixel at a time on the facial images S1, and the positions of eyes included in the image within the mask M are detected.

Note that during learning of the second reference data E2, sample images are utilized, in which the distances between the centers of the eyes are one of 9.7, 10, and 10.3 pixels. Therefore, the magnification rate during enlargement/reduction of the facial images S1 may be set to be 10.3/9.7. In addition, during learning of the reference data E2, sample images are utilized, in which faces are rotated within a range of ±3 degrees. Therefore, the facial images S1 may be rotated over 360 degrees in 6 degree increments.

Note that the second characteristic amount calculating means 32 calculates the characteristic amounts C0 at each step in the stepwise enlargement/reduction and rotation of the facial images S1.

In the present embodiment, the discrimination points are added at each step in the stepwise deformation of each of the facial images S1 obtained by the face detecting section 20. The step of deformation at which the total sum of the discrimination points within the 30×30 pixel size mask M is the greatest is determined. The upper left corner of the facial image within the mask M is set as the origin of a coordinate system. The coordinates of the positions of the eyes (x1, y1) and (x2, y2) are obtained, and positions corresponding to these coordinates in the facial images S1, prior to deformation thereof, are discriminated as the positions of the eyes.

The eye detecting section 30 detects the positions of the eyes from within the facial images S1 as described above. The positional data G1 of the eyes and positional data of the true facial images S2 are output to the inner/outer corner detecting section 40 and the mouth corner detecting section 50.

Figure 15:
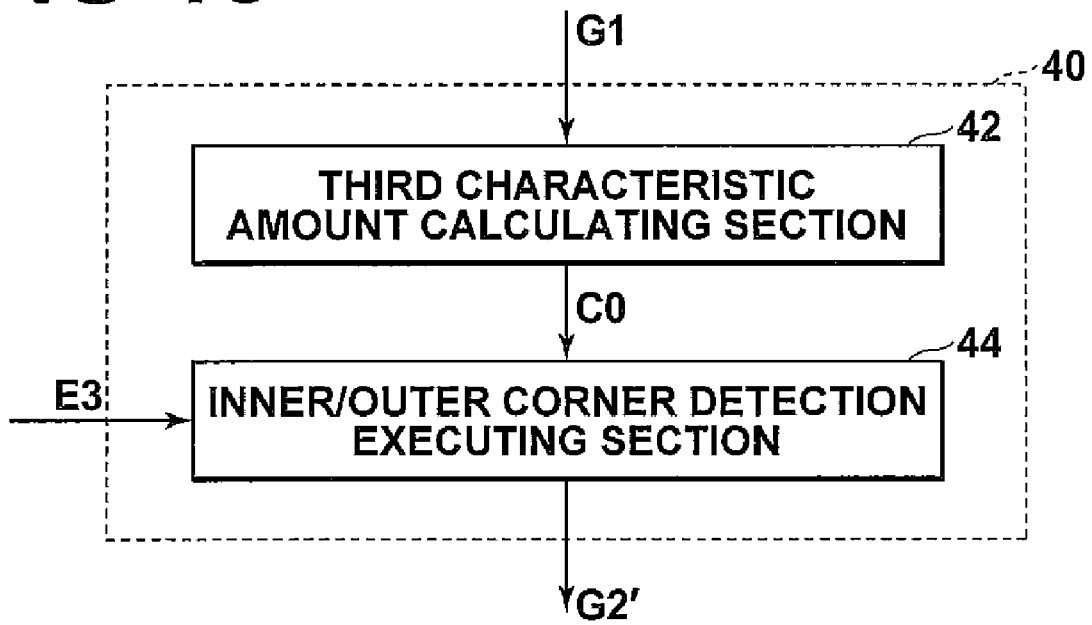
FIG. 15 is a block diagram that illustrates the construction of an inner/outer corner detecting section 40.

FIG. 15 is a block diagram that illustrates the construction of the inner/outer corner detecting section 40. The inner/outer corner detecting section 40 detects the positions of the inner and outer corners of the eyes within eye vicinity images S3, which are images of regions having a predetermined range about the eyes detected in the true facial images S2 obtained by the eye detecting section 30. As illustrated in FIG. 15, the inner/outer corner detecting section 40 comprises: a third characteristic amount calculating section 42, for calculating characteristic amounts C0 from the eye vicinity images S3; and an inner/outer corner detection executing section 49, for executing detection of the positions of the inner and outer corners of the eyes, based on the characteristic amounts C0 and the reference data E3 recorded in the first database 60, and obtaining positional data G2' of the inner and outer corners of the eyes.

The third characteristic amount calculating section 42 is the same as the first characteristic amount calculating section 22 of the face detecting section 20, except that the characteristic amounts C0 are calculated from the eye vicinity images S3 and not the input images S0. Therefore, a detailed description thereof will be omitted.

The third reference data E3 recorded in the first database 60 define discriminating conditions for combinations of the characteristic amounts C0 for each pixel of each of a plurality of types of pixel groups, which are constituted by a plurality of pixels selected from sample images, to be described later.

The combinations of the characteristic amounts C0 for each pixel of the plurality of types of pixel groups and the discriminating conditions of the reference data E3 are determined by learning a plurality of sample images, which are known to be of eyes, and a plurality of sample images, which are known not to be of eyes.

Figure 17:
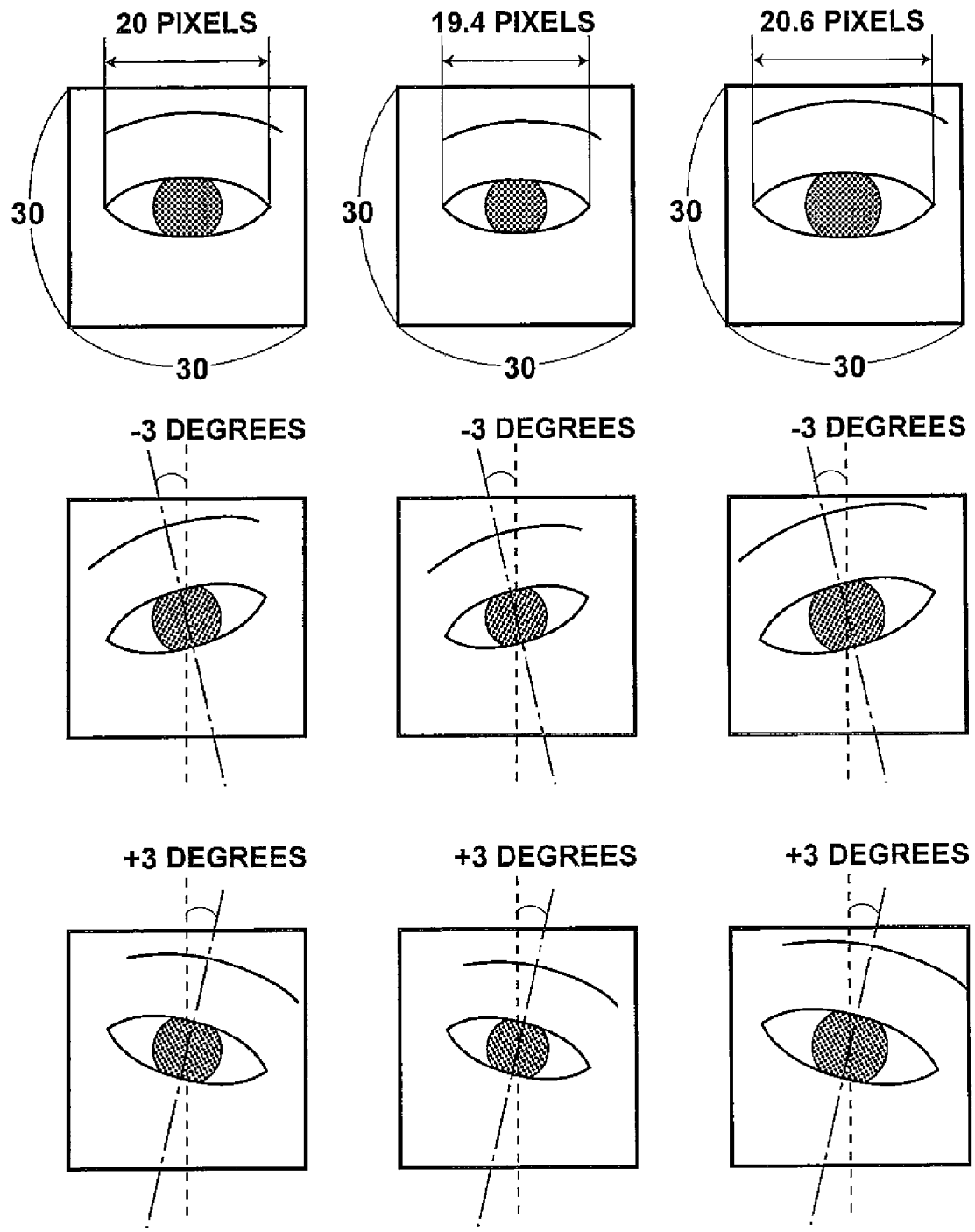
FIG. 17 illustrates examples of sample images, which are known to be of eyes, employed during learning of reference data E3.

The sample images, which are employed during generation of the third reference data E3 and are known to be of eyes, have the following specifications, as illustrated in FIG. 17. That is, the sample images are of a 30×30 pixel size, the distances between the inner and outer corners of the eyes are one of 19.4, 20, and 20.6 pixels, and each of the eyes is rotated at one degree intervals within a range ±3 degrees from a state in which a line segment that connects the inner and outer corners is horizontal. Similarly to the second reference data E2, the degree of tolerance of the third reference data E3 is narrower than that of the reference data E1, thereby enabling accurate detection of the positions of the inner and outer corners of the eyes. Note that in FIG. 17, only sample images which are rotated at −3 degrees, 0 degrees, and +3 degrees are shown. In addition, the centers of rotation of the sample images are the intersections of the diagonals thereof. Here, the positions of the inner and outer corners of the eyes are uniform in all of the sample images in which the distances therebetween are 20 pixels. The positions of the inner and outer corners of the eyes are designated as (x1', y1') and (x2', y2') on a coordinate plane having the upper left corner of the sample image as its origin. The positions of the inner and outer corners of the eyes in the vertical direction (that is, y1' and y2') are the same for all of the sample images.

Arbitrary images of a 30×30 pixel size are employed as the sample images which are known to not be of eyes.

Note that the learning performed to generate the third reference data E3 is the same as that performed to generate the second reference data E2, except that the sample image groups are different between the two. Therefore, a detailed description thereof will be omitted.

The inner/outer corner detection executing section 49 refers to the discriminating conditions of the reference data E3, which has been learned regarding every combination of the characteristic amounts C0 of each pixel that constitutes a plurality of types of pixel groups, within the eye vicinity images S3 which are images of regions having a predetermined range about the eyes detected in the true facial images S2 obtained by the eye detecting section 30. Thereby, discrimination points of the combinations of the characteristic amounts C0 of each pixel that constitutes each of the pixel groups are obtained. The positions of the inner and outer corners of the eyes are detected by totaling the discrimination points. At this time, of the characteristic amounts C0, the directions of the gradient vectors K are quaternarized, and the magnitudes of the gradient vectors K are ternarized.

Here, the inner/outer corner detection executing section 44 enlarges/reduces the eye vicinity images S3 in a stepwise manner. In addition, the eye vicinity images S3 are rotated in a stepwise manner over 360 degrees. A mask M, which is 30×30 pixels large, is set on the eye vicinity images S3, at every stepwise increment of the enlargement/reduction. The mask M is moved one pixel at a time on the eye vicinity images S3, and the positions of the inner and outer corners of the eyes included in the image within the mask M are detected.

Note that during learning of the third reference data E3, sample images are utilized, in which the distances between the inner and outer corners of the eyes are one of 19.4, 20, and 20.6 pixels. Therefore, the magnification rate during enlargement/reduction of the eye vicinity images S3 may be set to be 20.6/19.4. In addition, during learning of the reference data E3, sample images are utilized, in which eyes are rotated within a range of ±3 degrees. Therefore, the eye vicinity images S3 may be rotated over 360 degrees in 6 degree increments.

Note that the third characteristic amount calculating means 42 calculates the characteristic amounts C0 at each step in the stepwise enlargement/reduction and rotation of the eye vicinity images S3.

In the present embodiment, the discrimination points are added at each step in the stepwise deformation of each of the eye vicinity images S3. The inner and outer corners of the eyes are discriminated by whether the sums of the discrimination points are positive or negative, and by the amounts of the sums. The upper left corner of the eye vicinity image S3 when it was discriminated as an eye within the 30×30 pixel mask M is set as the origin of a coordinate system. The coordinates (x1', y1') and (x2', y2') of the positions of the inner and outer corners of the eyes in the sample images are obtained, and positions corresponding to these coordinates in the eye vicinity images S3, prior to deformation thereof, are discriminated as the positions of the inner and outer corners of the eyes.

The inner/outer corner detecting section 40 detects the positions of the inner and outer corners of the eyes from within the eye vicinity images S3 as described above. The positional data G2' of the inner and outer corners of the eyes is output to the inner/outer corner and mouth corner selecting section 65.

Note that the inner/outer corner detecting section 40 detects the inner and outer corners of both right and left eyes from eye vicinity images S3 corresponding thereto. At this time, it is considered that although the shapes of the right and left eyes are different, they become the same if inverted in the horizontal direction. For example, the third reference data E3 may be prepared by learning employing sample images of only the left eye. When the inner and outer corners of left eyes are detected, the characteristic amounts C0 are calculated from within images within the mask M and the reference data E3 is referred to. When the inner and outer corners of right eyes are detected, the characteristic amounts C0 are calculated from within images within the mask M which are inverted horizontally, and the reference data E3 is referred to. Alternatively, it may be considered that both the right and left eyes approximate a horizontally symmetrical shape. In this case, the reference data E3 may be prepared by learning employing sample images of both right eyes and left eyes. When the inner and outer corners of either right eyes or left eyes are detected, the characteristic amounts C0 are calculated from within images within the mask M, and the reference data E3 is referred to.

Figure 16:
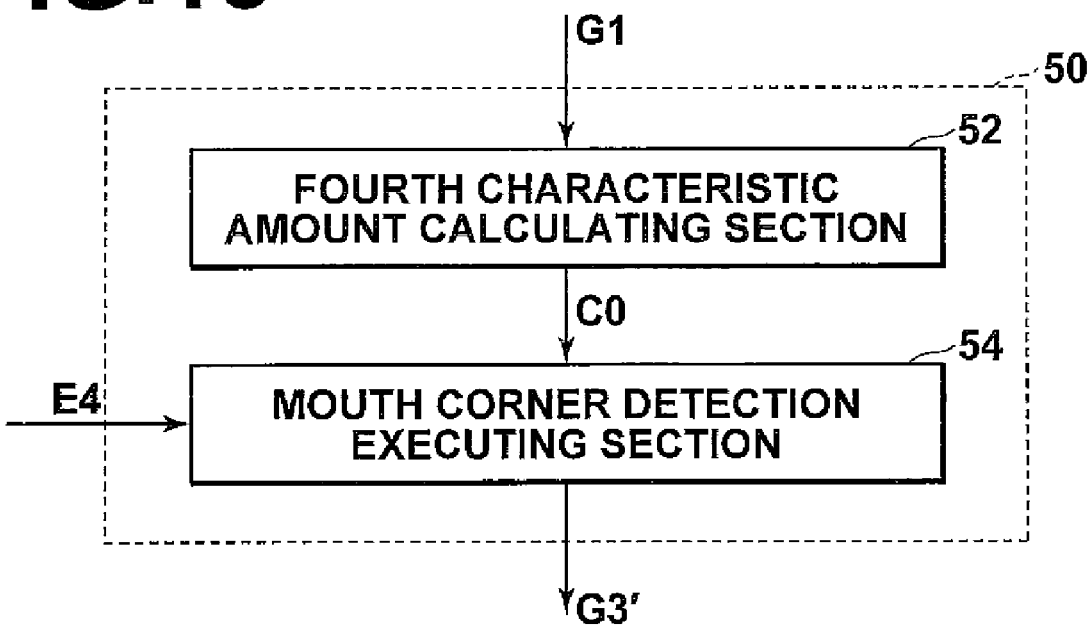
FIG. 16 is a block diagram that illustrates the construction of a mouth corner detecting section 50.

FIG. 16 is a block diagram that illustrates the construction of the mouth corner detecting section 50. The mouth corner detecting section 50 detects the positions of the right and left corners of mouths within mouth vicinity images S4, which are images of regions having a predetermined range and a predetermined positional relationship with the eyes detected in the true facial images S2 obtained by the eye detecting section 30. As illustrated in FIG. 16, the mouth corner detecting section 50 comprises: a fourth characteristic amount calculating section 52, for calculating characteristic amounts C0 from the mouth vicinity images S4; and a mouth corner detection executing section 54, for executing detection of the positions of the right and left corners of the mouths, based on the characteristic amounts C0 and the reference data E4 recorded in the first database 60, and obtaining positional data G3' of the corners of the mouths.

The fourth characteristic amount calculating section 52 is the same as the first characteristic amount calculating section 22 of the face detecting section 20, except that the characteristic amounts C0 are calculated from the mouth vicinity images S4 and not the input images S0. Therefore, a detailed description thereof will be omitted.

The fourth reference data E4 recorded in the first database 60 define discriminating conditions for combinations of the characteristic amounts C0 for each pixel of each of a plurality of types of pixel groups, which are constituted by a plurality of pixels selected from sample images, to be described later.

The combinations of the characteristic amounts C0 for each pixel of the plurality of types of pixel groups and the discriminating conditions of the reference data E4 are determined by learning a plurality of sample images, which are known to be of mouths, and a plurality of sample images, which are known not to be of mouths.

Figure 18:
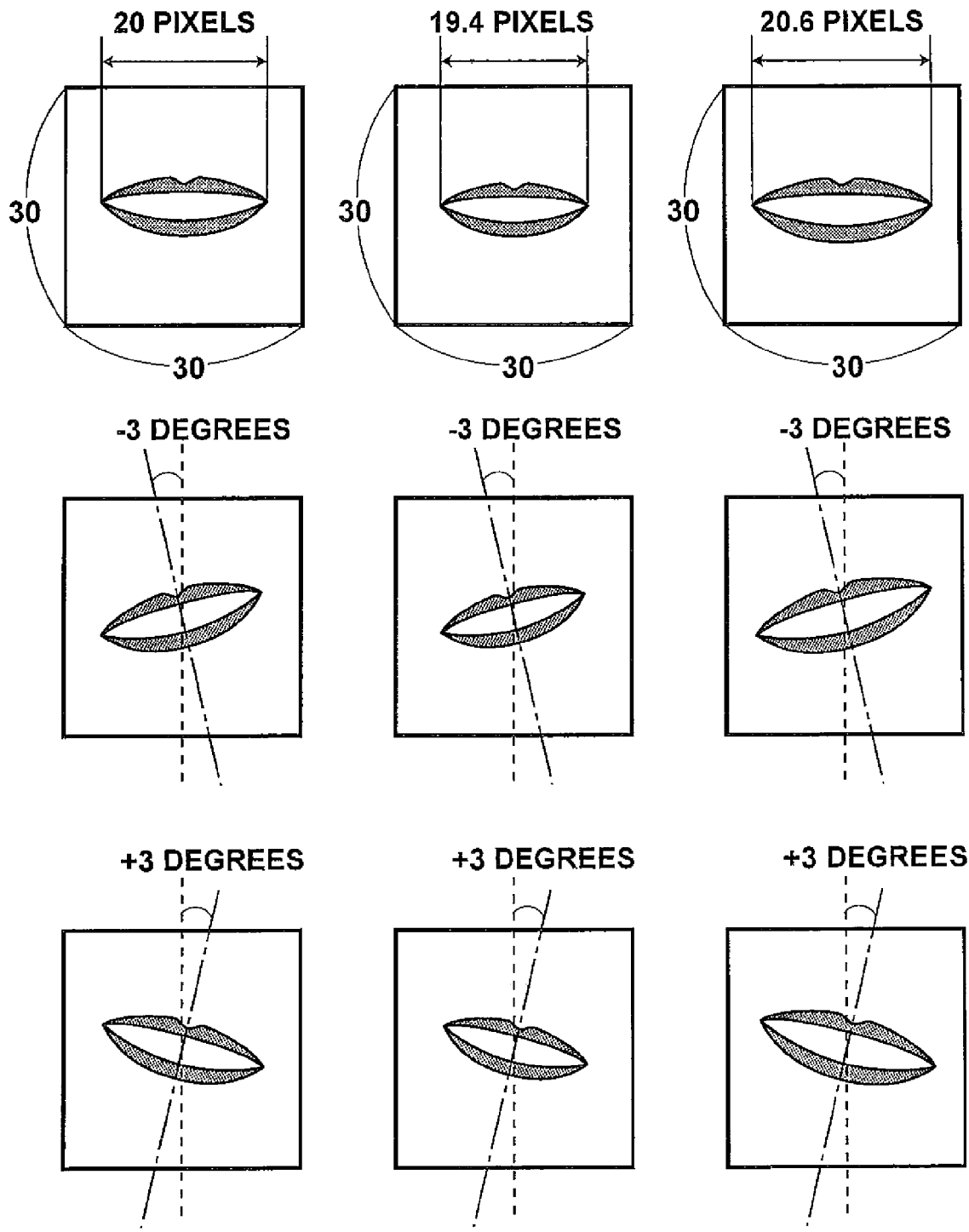
FIG. 18 illustrates examples of sample images, which are known to be of mouths, employed during learning of reference data E1.

The sample images, which are employed during generation of the fourth reference data E4 and are known to be of mouths, have the following specifications, as illustrated in FIG. 18. That is, the sample images are of a 30×30 pixel size, the distances between the right and left corners of the mouths are one of 19.4, 20, and 20.6 pixels, and each of the mouths is rotated at one degree intervals within a range ±3 degrees from a state in which a line segment that connects the inner and outer corners is horizontal. Similarly to the second reference data E2, the degree of tolerance of the fourth reference data E4 is narrower than that of the reference data E1, thereby enabling accurate detection of the positions of the right and left corners of the mouths. Note that in FIG. 18, only sample images which are rotated at −3 degrees, 0 degrees, and +3 degrees are shown. In addition, the centers of rotation of the sample images are the intersections of the diagonals thereof. Here, the positions of the right and left corners of the mouths are uniform in all of the sample images in which the distances therebetween are 20 pixels. The positions of the right and left corners of the mouths are designated as (x1", y1") and (x2", y2") on a coordinate plane having the upper left corner of the sample image as its origin. The positions of the right and left corners of the mouths in the vertical direction (that is, y1" and y2") are the same for all of the sample images.

Arbitrary images of a 30×30 pixel size are employed as the sample images which are known to not be of mouths.

Note that the learning performed to generate the fourth reference data E4 is the same as that performed to generate the second reference data E2, except that the sample image groups are different between the two. Therefore, a detailed description thereof will be omitted.

The mouth corner detection executing section 54 refers to the discriminating conditions of the reference data E4, which has been learned regarding every combination of the characteristic amounts C0 of each pixel that constitutes a plurality of types of pixel groups, within the mouth vicinity images S4 which are images of regions having a predetermined range and a predetermined positional relationship with the eyes detected in the true facial images S2 obtained by the eye detecting section 30. Thereby, discrimination points of the combinations of the characteristic amounts C0 of each pixel that constitutes each of the pixel groups are obtained. The positions of the inner and outer corners of the eyes are detected by totaling the discrimination points. At this time, of the characteristic amounts C0, the directions of the gradient vectors K are quaternarized, and the magnitudes of the gradient vectors K are ternarized.

Here, the mouth corner detection executing section 54 enlarges/reduces the mouth vicinity images S4 in a stepwise manner. In addition, the mouth vicinity images S4 are rotated in a stepwise manner over 360 degrees. A mask M, which is 30×30 pixels large, is set on the eye vicinity images S3, at every stepwise increment of the enlargement/reduction. The mask M is moved one pixel at a time on the mouth vicinity images S4, and the positions of the right and left corners of the mouths included in the image within the mask M are detected.

Note that during learning of the fourth reference data E4, sample images are utilized, in which the distances between the right and left corners of the mouths are one of 19.4, 20, and 20.6 pixels. Therefore, the magnification rate during enlargement/reduction of the mouth vicinity images S4 may be set to be 20.6/19.4. In addition, during learning of the reference data E4, sample images are utilized, in which mouths are rotated within a range of ±3 degrees. Therefore, the mouth vicinity images S4 may be rotated over 360 degrees in 6 degree increments.

Note that the fourth characteristic amount calculating means 52 calculates the characteristic amounts C0 at each step in the stepwise enlargement/reduction and rotation of the mouth vicinity images S4.

In the present embodiment, the discrimination points are added at each step in the stepwise deformation of each of the mouth vicinity images S4. The right and left corners of the mouths are discriminated by whether the sums of the discrimination points are positive or negative, and by the amounts of the sums. The upper left corner of the mouth vicinity image S4 when it was discriminated as a mouth within the 30×30 pixel mask M is set as the origin of a coordinate system. The coordinates (x1", y1") and (x2", y2") of the positions of the right and left corners of the eyes in the sample images are obtained, and positions corresponding to these coordinates in the mouth vicinity images S4, prior to deformation thereof, are discriminated as the positions of the right and left corners of the mouths.

The mouth corner detecting section 50 detects the positions of the right and left corners of the mouths from within the mouth vicinity images S4 as described above. The positional data G3' of the right and left corners of the mouths is output to the inner/outer corner and mouth corner selecting section 65.

The inner/outer corner and mouth corner selecting section 65 selects inner and outer corners of a right eye, inner and outer corners of a left eye, and right and left corners of a mouth which have appropriate positional relationships with each other from among all of the detected inner and outer corners of eyes and right and left corners of mouths, based on the positional data G2' and G3' thereof. Conditions, such as: a line segment that connects the outer corners of the right and left eyes must be substantially parallel to a line segment that connects the right and left corners of the mouth; and line segments that connect the inner and outer corners of the right and left eyes, respectively, must be substantially axially symmetrical about the central axis of a true facial image S2, are set. The inner and outer corners of the eyes and the right and left corners of the mouth are selected such that these conditions are satisfied as much as possible. The inner/outer corner and mouth corner selecting section 65 outputs the positional data G2' of the selected inner and outer corners of the eyes to the upper/lower eyelid characteristic point detecting section 70, and outputs the positional data G3' of the selected right and left corners of the mouth to the upper/lower lip characteristic point detecting section 80.

Figure 19:
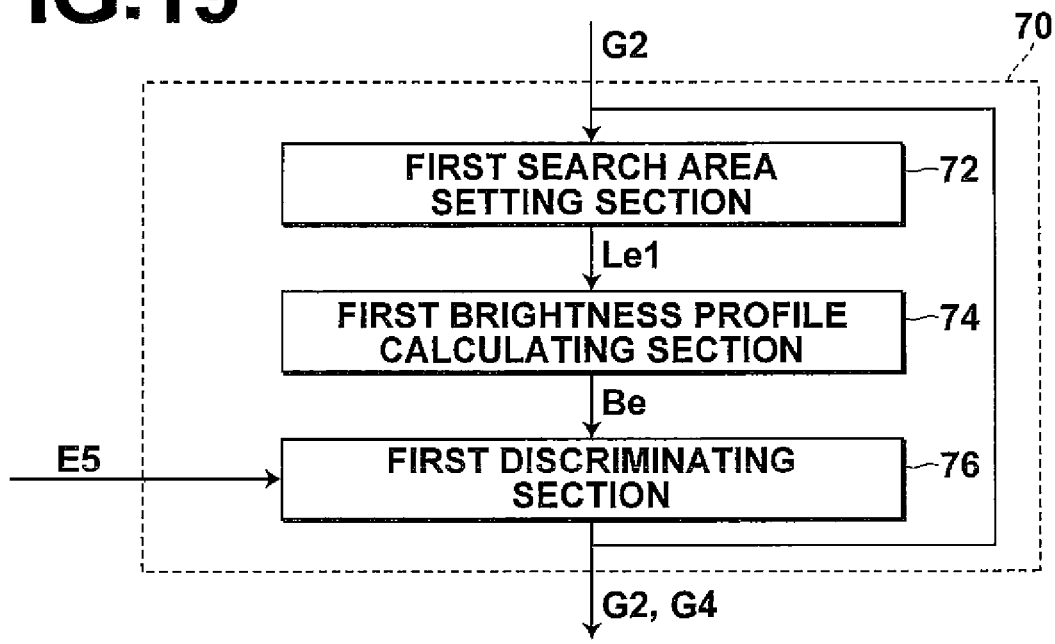
FIG. 19 is a block diagram that illustrates the construction of an upper/lower eyelid characteristic point detecting section 70.

FIG. 19 is a block diagram that illustrates the construction of the upper/lower eyelid characteristic point detecting section 70. The upper/lower eyelid characteristic point detecting section 70 detects characteristic points of upper and lower eyelids that represent the outline of an eye for both the right and left eyes, based on positional data of the inner and outer corners of the right and left eyes selected by the inner/outer corner and mouth corner selecting section 65. As illustrated in FIG. 19, the upper/lower eyelid characteristic point detecting section 70 comprises: a first search area setting section 72, for setting an area Le1 within which characteristic points of the upper and lower eyelids are to be searched for, based on the positions of the inner and outer corners of an eye; a first brightness profile calculating section 74, for calculating one dimensional brightness profiles Be for each pixel within the search area Le1 set by the first search area setting section 72; and a first discriminating section 76, for discriminating whether discrimination target pixels represent characteristic points of the upper and lower eyelids, based on the brightness profiles Be calculated by the first brightness profile calculating section 74 and the reference data E5 stored in the second database 90.

The first search area setting section 72 sets an eyelid reference line segment Le1, which is perpendicular to a line segment Le0 that connects the inner and outer corners of an eye detected by the inner/outer corner detecting section 40, as the search area. In the present embodiment, the line segment Le1 is set to be of a predetermined width (11 pixels, for example) perpendicular to the line segment Le0, with the midpoint of the line segment Le0 being the center of the width. Note that the line segment Le1 is set for each eye.

Here, the reference data E5 stored in the second database 90 will be described. The reference data E5 defines brightness profiles which are defined for characteristic points that represent midpoints of the outlines of the upper and lower eyelids, and discriminating conditions with respect to brightness profiles. The reference data E5 is determined in advance by learning positions, which are known to correspond to the characteristic points, and positions, which are known not to correspond to the characteristic points, within a plurality of sample images of eyes. Here, obtainment of discriminating conditions with respect to a brightness profile that represents the midpoint of an upper eyelid will be described as an example.

Figure 21A:
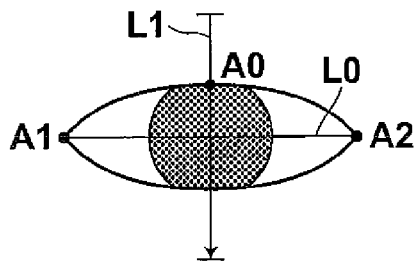
FIGS. 21A and 21B are diagrams for explaining a brightness profile which is defined with respect to a characteristic point that represents the midpoint of an upper eyelid.
Figure 21B:
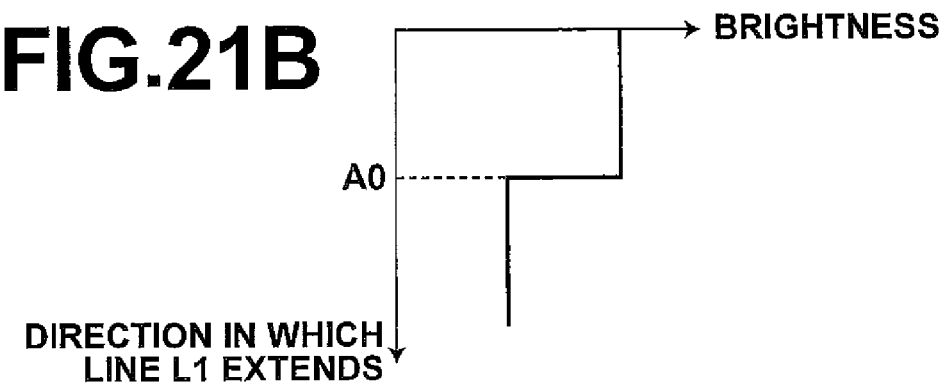

In the present embodiment, the sample images employed to generate the reference data E5 are of a 30×30 pixel size, and the distances between the inner and outer corners of the eyes are normalized to be 20 pixels. As illustrated in FIGS. 21A and 21B, the brightness profile defined with respect to the characteristic point that represents the midpoint of the outline of the upper eyelid is the brightness profile of 11 pixels of a line segment L1, which is perpendicular to a line segment L0 that connects the inner and outer corners A1 and A2 of an eye, which passes through a characteristic point A0 at the midpoint of the upper eyelid, and which has the characteristic point A0 at its midpoint. First, the brightness profile at the position of the characteristic point A0 is calculated in each of the sample images. Then, brightness profiles as defined above are calculated with respect to arbitrary points other than the midpoint of the outline of the upper eyelid.

In order to reduce processing time, the profiles are polytomized, for example, into five values. Specifically, the polytomization is performed by obtaining variances $\sigma$ of each brightness value (in the case of the brightness profile of the characteristic point positioned at the midpoint of the outline of the upper eyelid, the brightness values of the 11 pixels employed to obtain the brightness profile) that constitutes the brightness profile. Then, polytomization is performed in units of variances, with an average brightness value Yav as the center of distribution. For example, brightness values less than or equal to (Yav−(¾σ)) may be assigned a value of 0, brightness values between (Yav−(¾σ)) and (Yav−(¼σ)) may be assigned a value of 1, brightness values between (Yav−(¼σ)) and (Yav+(¼σ)) may be assigned a value of 2, brightness values between (Yav+(¼σ)) and (Yav+(¾σ)) may be assigned a value of 3, and brightness values greater than or equal to (Yav+(¾σ)) may be assigned a value of 4.

The discriminating conditions for discriminating the profile of the characteristic point representing the midpoint of the outline of the upper eyelid are obtained by learning the polytomized profiles of the characteristic points representing the midpoint of the outline of the upper eyelid in each of the sample images (hereinafter, referred to as the "first profile group") and the profiles of the arbitrary points (hereinafter, referred to as the "second profile group").

The technique for learning the two types of profile groups is the same as that for learning the reference data E1 employed by the face detecting section 20 and for learning the referenced data E2 employed by the eye detecting section 30. The technique will be described briefly here.

The generation of a discriminator will be described first. The shape of the combination of each of the brightness values that constitute a brightness profile is designated as the brightness profile. There are five brightness values, 0, 1, 2, 3, and 4, and each brightness profile includes 11 pixels. Therefore, the number of combinations of the brightness values is $5^{11}$, which would require a great amount of time and memory to learn and detect. For this reason, only a portion of the pixels that constitute each brightness profile is employed in the present embodiment. For example, in the case that the profile is constituted by brightness values of 11 pixels, only the brightness values of the $2^{nd}$, the $6^{th}$, and the $10^{th}$ pixel are employed. The number of combinations of these three pixels is $5^3$, and therefore reductions in processing time and the amount of memory used can be achieved. When generating the discriminator, first, combinations of the brightness values (combinations of the brightness values of the $2^{nd}$, $6^{th}$, and $10^{th}$ pixels) of all of the profiles within the first profile group are obtained, and histograms are generated. Similarly, histograms are generated for the profiles included in the second profile group. Histograms that represent logarithms of the frequency ratio between the two histograms are employed as the discriminators for brightness profiles of the characteristic point. In a manner similar to that of the discriminator generated to detect faces, if the value (discrimination point) indicated by each vertical axis of the histograms of the discriminators is positive, the probability that the position of the profile having the brightness value distribution corresponding to the discrimination point is the characteristic point that represents the midpoint of the outline of the upper eyelid is high. This probability increases as the absolute value of the discrimination point increases. On the other hand, if the discrimination point is negative, the probability that the position of the profile having the brightness value distribution corresponding to the discrimination point is not the characteristic point that represents the midpoint of the outline of the upper eyelid is high. This probability also increases as the absolute value of the discrimination point increases.

A plurality of discriminators in the histogram format are generated with respect to the brightness profiles of the characteristic points representing the midpoint of the outline of the upper eyelid.

Next, a discriminator, which is most effective in discriminating whether a characteristic point is that which represents the midpoint of the outline of an upper eyelid, is selected from the plurality of generated discriminators. Here, the method for selecting the most effective discriminator for discriminating the brightness profiles of characteristic points is the same as the method for selecting the discriminator for the reference data E1 employed by the face detecting section 20. Therefore, a detailed description will be omitted.

The type of discriminator and the discriminating conditions, to be employed in discriminating whether a brightness profile is that of the characteristic point representing the midpoint of the outline of the upper eyelid, is determined as a result of learning the first profile group and the second profile group.

Here, the machine learning technique employed to learn the first profile group and the second profile group is based on the adaptive boosting technique. However, the present invention is not limited to this configuration. Other machine learning techniques, such as the neural network technique, may be employed.

The reference data E5 is generated by generating the discriminators and determining the discriminating conditions for characteristic points that represent the midpoints of the outlines of the upper and lower eyelids in this manner.

The first brightness profile calculating section 74 calculates one dimensional brightness profiles Be, which have been defined with respect to the characteristic point corresponding to the eyelid reference line segment Le1 and is used to discriminate the characteristic point, at the position of each pixel of the eyelid reference line segment Le1 set by the first search area setting section 72. The brightness profiles are the brightness profiles of 11 pixels along the eyelid reference line segment Le1, having single pixels on the eyelid reference line segment Le1 as their centers.

The first discriminating section 76 discriminates whether each of the brightness profiles calculated by the first brightness profile calculating section 74 is a brightness profile of a characteristic point that represents the midpoint of the outline of either the upper or lower eyelid. Specifically, discrimination points are obtained for each of the 21 brightness profiles which have been obtained for the position of each pixel on the eyelid reference line segment Le1, employing the discriminator and discriminating conditions for the brightness profile of the characteristic point that represents the midpoint of the outline of the upper eyelid, included in the reference data E5. In the case that the sum of the discrimination points is positive, the probability that the brightness profile is that of the characteristic point that represents the midpoint of the upper eyelid is high. That is, the probability that the pixel corresponding to the brightness profile (the center pixel of the 11 pixels, or the $6^{th}$ pixel) is the characteristic point that represents the midpoint of the outline of the upper eyelid is high. On the other hand, in the case that the sum of the discrimination points is negative, the brightness profile is discriminated not to be that of the characteristic point that represents the midpoint of the upper eyelid. That is, the pixel corresponding to the brightness profile is discriminated not to be the characteristic point that represents the midpoint of the upper eyelid. The first discriminating section 76 discriminates a center pixel corresponding to a brightness profile, of which the sum of the discrimination points is positive and the absolute value is the greatest, as the characteristic point that represents the midpoint of the outline of the upper eyelid. On the other hand, in the case that there are no brightness profiles that have positive sums of discrimination points from among the 21 brightness profiles, it is discriminated that none of the 21 pixels corresponding to the 21 brightness profiles are the characteristic point that represents the midpoint of the outline of the upper eyelid. Discrimination is performed in a similar manner with respect to the characteristic point that represents the midpoint of the outline of the lower eyelid as well. The results of discrimination are output to the output section 100 as positional data G4, which is the positional data of the characteristic points that represent the midpoints of the outlines of the upper and lower eyelids.

Figure 20:
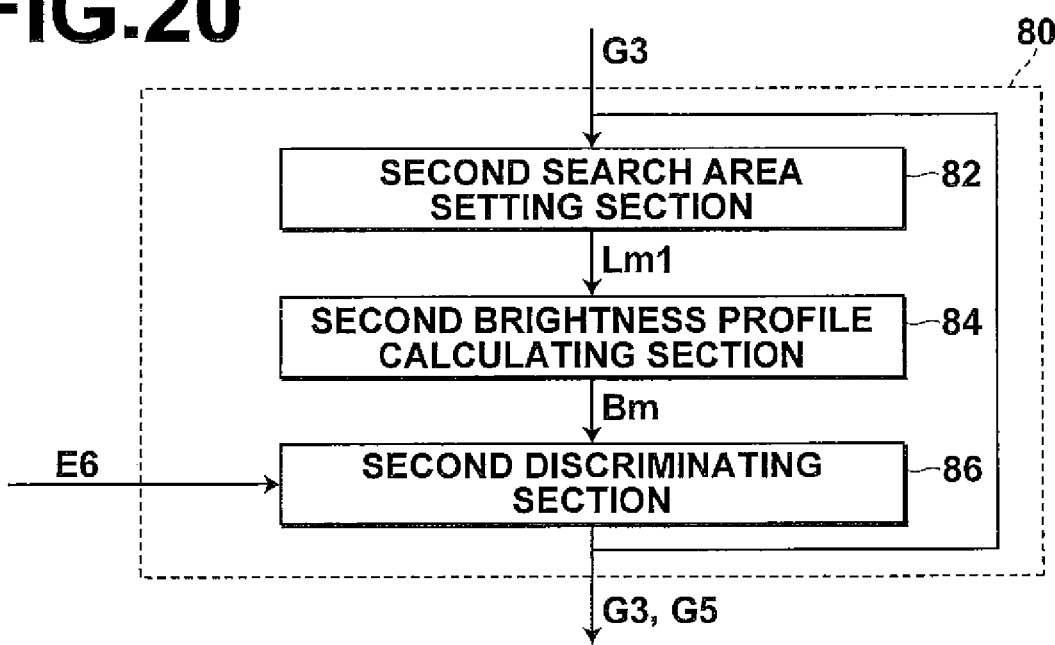
FIG. 20 is a block diagram that illustrates the construction of an upper/lower lip characteristic point detecting section 80.

FIG. 20 is a block diagram that illustrates the construction of the upper/lower lip characteristic point detecting section 80. The upper/lower lip characteristic point detecting section 80 detects characteristic points of upper and lower lips that represent the outline of a mouth, based on positional data of the right and left corners of the mouth selected by the inner/outer corner and mouth corner selecting section 65. As illustrated in FIG. 20, the upper/lower lip characteristic point detecting section 80 comprises: a second search area setting section 82, for setting an area Lm1 within which characteristic points of the upper and lower lips are to be searched for, based on the positions of the right and left corners of a mouth; a second brightness profile calculating section 84, for calculating one dimensional brightness profiles Bm for each pixel within the search area Lm1 set by the second search area setting section 82; and a second discriminating section 86, for discriminating whether discrimination target pixels represent characteristic points of the upper and lower lips, based on the brightness profiles Bm calculated by the second brightness profile calculating section 84 and the reference data E6 stored in the second database 90.

The second search area setting section 82 sets a mouth reference line segment Lm1, which is perpendicular to a line segment Lm0 that connects the right and left corners of a mouth detected by the mouth corner detecting section 50, as the search area. In the present embodiment, the line segment Lm1 is set to be of a predetermined width (11 pixels, for example) perpendicular to the line segment Lm0, with the midpoint of the line segment Lm0 being the center of the width.

Figure 22A:
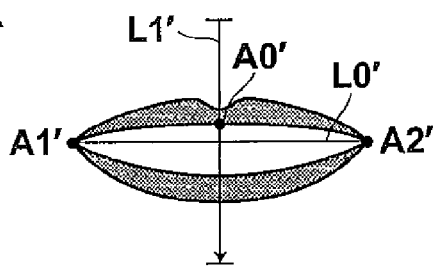
FIGS. 22A and 22B are diagrams for explaining a brightness profile which is defined with respect to a characteristic point that represents the midpoint of an upper lip.
Figure 22B:
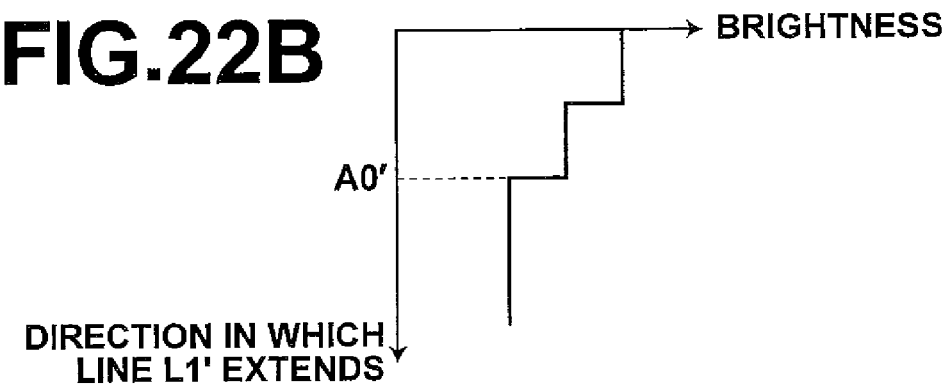

Here, the reference data E6 stored in the second database 90 will be described. The reference data E6 defines brightness profiles which are defined for characteristic points that represent midpoints of the outlines of the upper and lower lips, and discriminating conditions with respect to brightness profiles. The reference data E6 is determined in advance by learning positions, which are known to correspond to the characteristic points, and positions, which are known not to correspond to the characteristic points, within a plurality of sample images of mouths. Note that the manner in which the reference data E6 is generated is the same as that by which the reference data E5 is generated, except that the sample images employed during learning differ. The sample images employed to generate the reference data E6 are of a 30×30 pixel size, and the distances between the right and left corners of the mouths are normalized to be 20 pixels. For example, as illustrated in FIGS. 22A and 22B, the brightness profile defined with respect to the characteristic point that represents the midpoint of the outline of the upper lip is the brightness profile of 11 pixels of a line segment L1', which is perpendicular to a line segment L0' that connects the right and left corners A1' and A2' of a mouth, which passes through a characteristic point A0' at the midpoint of the upper lip, and which has the characteristic point A0' at its midpoint.

The second brightness profile calculating section 84 calculates one dimensional brightness profiles Bm, which have been defined with respect to the characteristic point corresponding to the mouth reference line segment Lm1 and is used to discriminate the characteristic point, at the position of each pixel of the eyelid reference line segment Lm1 set by the second search area setting section 82. The brightness profiles are the brightness profiles of 11 pixels along the mouth reference line segment Lm1, having single pixels on the mouth reference line segment Lm1 as their centers.

The second discriminating section 86 discriminates whether each of the brightness profiles calculated by the second brightness profile calculating section 84 is a brightness profile of a characteristic point that represents the midpoint of the outline of either the upper or lower lip. The results of discrimination are output to the output section 100 as positional data G5, which is the positional data of the characteristic points that represent the midpoints of the outlines of the upper and lower lips.

The output section 100 combines the positional data G2 of the inner and outer corners of the eyes obtained by the inner/outer corner detecting section 40 with the positional data G4 of the midpoints of the outlines of the upper and lower eyelids obtained by the eyelid characteristic point detecting section 70, and outputs the combined data as positional data GG1 of characteristic point groups that represent the outlines of the right and left eyes. The output section 100 also combines the positional data G3 of the right and left corners of the mouth obtained by the mouth corner detecting section 50 with the positional data G5 of the midpoints of the outlines of the upper and lower lips, and outputs the combined data as positional data GG2 of a characteristic point group that represents the outline of the mouth.

FIG. 23 is a flow chart that illustrates the processes performed by the facial characteristic point detecting apparatus of FIG. 1. As illustrated in FIG. 23, first, an image S0 is input to the facial characteristic point detecting apparatus (step ST11). Then, the face detecting section 20 detects faces included within the input image S0 (step ST12). Next, the eye detecting section 30 obtains the positions of eyes included in the faces of the input image S0 (step ST13). Thereafter, the inner/outer corner detecting section 40 and the mouth corner detecting section 50 detects the inner and outer corners of the eyes and the right and left corners of mouths that constitute the faces included in the input image S0 (step ST14). At this time, a plurality of sets of the inner and outer corners of the eyes and the right and left corners of the mouths may be detected at this time. The inner/outer corner and mouth corner selecting section 65 selects appropriate inner and outer corners of the eyes and right and left corners of the mouth according to conditions defined for the structure of faces, based on the positional relationships thereof (step ST15). The eyelid characteristic point detecting section 70 and the lip characteristic point detecting section 80 detect characteristic points that represent the midpoints of the outlines of the upper and lower eyelids and characteristic points that represent the midpoints of the outlines of the upper and lower lips, based on the selected inner and outer corners of the eyes and right and left corners of the mouth, respectively (step ST16). The output section 100 combines the characteristic points into characteristic point groups that represent the outlines of the eyes and a characteristic point group that represents the outline of the mouth and outputs the characteristic point groups (step ST17).

The facial characteristic point detecting apparatus of the present embodiment first detects a face included in a detection target image. Detection data of the face is employed to detect eyes which are included in the face. Detection data of the eyes are employed to detect the inner and outer corners of the eyes. Detection data of the inner and outer corners of the eyes is employed to detect characteristic points of the upper and lower eyelids that represent the outline of the eyes. Thereby, the characteristic points that represent the outlines of the eyes can be efficiently and accurately detected according to a coarse to fine detection concept, without burdening users.

Further, the facial characteristic point apparatus of the present embodiment employs the detection data of the eyes to estimate the positions of mouths, which have predetermined positional relationships with the eyes. Then, the right and left corners of the mouth are detected, and positional data of the corners of the mouth is employed to detect characteristic points of the upper and lower lips that represent the outline of the mouth. Thereby, the characteristic points that represent the outline of the mouth can also be efficiently and accurately detected.

Note that detection of the characteristic points of the upper and lower eyelids is performed by: setting at least one eyelid reference line segment, corresponding to the characteristic points, that intersects a line segment that connects the detected inner and outer corners of a detected eye; calculating one dimensional brightness profiles for discriminating the characteristic points, which are defined for the characteristic points, with respect to each pixel of one of the eyelid reference line segments; and administering a process to discriminate whether each of the pixels is a pixel that represents the characteristic point, based on the brightness profile. The eyelid characteristic point discriminating process is administered with respect to all of the set eyelid reference line segments. In addition, detection of the characteristic points of the upper and lower lips is performed by: setting at least one lip reference line segment, corresponding to the characteristic points, that intersects a line segment that connects the detected right and left corners of a mouth; calculating one dimensional brightness profiles for discriminating the characteristic points, which are defined for the characteristic points, with respect to each pixel of one of the lip reference line segments; and administering a process to discriminate in whether each of the pixels is a pixel that represents the characteristic point, based on the brightness profile. The lip characteristic paint discriminating process is administered with respect to all of the set lip reference line segments. That is, the characteristic points of the upper and lower eyelids and the upper and lower lips are detected, employing one dimensional brightness profiles, which have smaller degrees of tolerance compared to two dimensional data such as image patterns. Accordingly, the characteristic points of the upper and lower eyelids and the upper and lower lips, the positions of which are difficult to specify, can be accurately detected.

Detection of each of the facial parts is performed by employing discriminators and discriminating conditions which have been obtained by learning using sample images and machine learning methods. Therefore, accurate and highly robust detection is enabled. The sample images employed in the learning, which are known to be of the specific facial part, are normalized such that the sizes and positions of the facial parts have predetermined degrees of tolerance. Accordingly, desired detection accuracy and robustness can be obtained by adjusting the degrees of tolerance.

In the present embodiment, the midpoints of the inner outline of the lips are employed as the characteristic points that represent the midpoints of the outline of the lips. Therefore, data regarding the outlines of lips can be more clearly extracted, compared to a case in which outer outlines of the lips, which are difficult to determine due to the borders between facial skin and lips being difficult to ascertain, are detected.

Note that in the present embodiment, an example has been described in which forward facing faces were included in the detection target image. However, characteristic points can be detected in a similar manner from faces in profile and obliquely facing faces.

A preferred embodiment of the present invention has been described above. However, the method, apparatus, and program for detecting facial characteristic points of present invention are not limited to the above embodiment. Various modifications and changes are possible, as long as they do not stray from the spirit of the invention.

For example, characteristic amounts of brightness profiles were employed to specify facial characteristic points in the above embodiment. Alternatively, any characteristic amount of brightness distributions capable of specifying facial characteristic points, such as brightness profile differentials, may be employed.

In addition, histograms were employed as the discriminators in the above embodiment. Alternatively, any discriminator employed in machine learning methods may be employed as the discriminators.

The invention claimed is:

1. A facial characteristic point detecting method, comprising the steps of:
   detecting a face included in an image, which is a target of detection;
   detecting eyes within the detected face, employing detection data obtained in the face detecting step;
   detecting inner and outer corners of the detected eyes, employing detection data obtained in the eye detecting step; and
   detecting characteristic points of upper and lower eyelids that represent the outline of the eyes, employing positional data of the inner and outer corners obtained in the inner and outer corner detecting step,
   wherein detection of the characteristic points of the upper and lower eyelids is performed by:
   setting at least one eyelid reference line segment, corresponding to the characteristic points, that intersects a line segment that connects the detected inner and outer corners of a detected eye;
   calculating characteristic amounts of one dimensional brightness distributions for discriminating the characteristic points, which are defined for the characteristic points corresponding to one of the at least one eyelid reference line segment, with respect to each pixel of the one eyelid reference line segment; and
   administering an eyelid characteristic point discriminating process, in which whether each of the pixels is a pixel that represents the characteristic point is discriminated, based on the characteristic amounts of the brightness distribution; wherein
   the eyelid characteristic point discriminating process is administered with respect to all of the set eyelid reference line segments.

2. A facial characteristic point detecting method as defined in claim 1, wherein:
   the eyelid characteristic point discriminating process is performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points from within a plurality of sample images of faces.

3. A facial characteristic point detecting method, comprising the steps of:
   detecting a face included in an image, which is a target of detection;
   detecting eyes within the detected face, employing detection data obtained in the face detecting step;
   detecting inner and outer corners of the detected eyes, employing detection data obtained in the eye detecting step; and
   detecting characteristic points of upper and lower eyelids that represent the outline of the eyes, employing positional data of the inner and outer corners obtained in the inner and outer corner detecting step,
   wherein:
   the face detecting step comprises the steps of:
   setting a mask image within the detection target image;
   calculating first characteristic amounts to be employed in face discrimination from the mask image; and
   discriminating whether a face is included within the mask image by referring to first reference data, in which the first characteristic amounts and discriminating conditions corresponding thereto are defined, obtained in advance by learning the first characteristic amounts from a sample image group including a plurality of sample images, which are known to be of faces and in which positional relationships between the pairs of eyes are normalized with a predetermined degree of tolerance, and a plurality of sample images, which are known not to be of faces, with a machine learning method, while deforming the mask image in stepwise variations corresponding to the predetermined degree of tolerance;
   the eye detecting step comprises the steps of:
   calculating second characteristic amounts to be employed in face discrimination from a detected facial region; and
   discriminating the positions of eyes included in the face by referring to second reference data, in which the second characteristic amounts and discriminating conditions corresponding thereto are defined, obtained in advance by learning the second characteristic amounts from a small tolerance sample image group including a plurality of sample images, which are known to be of faces and in which positional relationships between the pairs of eyes are normalized with a degree of tolerance smaller than the predetermined degree of tolerance, and a plurality of sample images, which are known not to be of faces, with a machine learning method, while deforming the image of the facial region in stepwise variations corresponding to the smaller degree of tolerance; and
   the inner and outer corner detecting step comprises the steps of:
   calculating third characteristic amounts to be employed in eye discrimination from a detected region that includes an eye; and
   discriminating the positions of the inner and outer corners of the eye by referring to third reference data, in which the third characteristic amounts and discriminating conditions corresponding thereto are defined, obtained in advance by learning the third characteristic amounts from a small tolerance sample image group including a plurality of sample images, which are known to be of eyes and in which positional relationships between the eyes and the inner and outer corners thereof are normalized with a degree of tolerance smaller than the predetermined degree of tolerance, and a plurality of sample images, which are known not to be of eyes, with a machine learning method, while deforming the image of the eye region in stepwise variations corresponding to the smaller degree of tolerance.

4. A facial characteristic point detecting method as defined in claim 3, wherein the inner and outer corner detecting step comprises the steps of:
   referring to the third reference data, which has been obtained by performing learning employing sample images of only the left or right eye, based on the third characteristic amounts calculated from the image of the eye region, to discriminate the positions of the inner and outer corners of one of a right or left eye; and
   referring to the third reference data, based on the third characteristic amounts calculated from the image of the eye region, which has been inverted in the horizontal direction, to discriminate the positions of the inner and outer corners of the other of the right or left eye.

5. A facial characteristic point detecting method, comprising the steps of:
   detecting a face included in an image, which is a target of detection;
   detecting eyes within the detected face, employing detection data obtained in the face detecting step;
   detecting inner and outer corners of the detected eyes, employing detection data obtained in the eye detecting step;
   detecting characteristic points of upper and lower eyelids that represent the outline of the eyes, employing positional data of the inner and outer corners obtained in the inner and outer corner detecting step;
   detecting right and left corners of a mouth, which have predetermined positional relationships with the detected eyes, employing the detection data obtained in the eye detecting step; and
   detecting characteristic points of upper and lower lips that represent the outline of the mouth, employing positional data of the right and left corners obtained in the right and left corner detecting step,
   wherein detection of the characteristic points of the upper and lower lips is performed by:
   setting at least one lip reference line segment, corresponding to the characteristic points, that intersects a line segment that connects the detected right and left corners of a mouth;
   calculating characteristic amounts of one dimensional brightness distributions for discriminating the characteristic points, which are defined for the characteristic points corresponding to one of the at least one lip reference line segment, with respect to each pixel of the one lip reference line segment; and
   administering a lip characteristic point discriminating process, in which whether each of the pixels is a pixel that represents the characteristic point is discriminated, based on the characteristic amounts of the brightness distribution; wherein
   the lip characteristic point discriminating process is administered with respect to all of the set lip reference line segments.

6. A facial characteristic point detecting method as defined in claim 5, wherein:
   the lip characteristic point discriminating process is performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points, from within a plurality of sample images of faces.

7. A facial characteristic point detecting method, comprising the steps of:
   detecting a face included in an image, which is a target of detection;
   detecting eyes within the detected face, employing detection data obtained in the face detecting step;
   detecting inner and outer corners of the detected eyes, employing detection data obtained in the eye detecting step;
   detecting characteristic points of upper and lower eyelids that represent the outline of the eyes, employing positional data of the inner and outer corners obtained in the inner and outer corner detecting step,
   detecting right and left corners of a mouth, which have predetermined positional relationships with the detected eyes, employing the detection data obtained in the eye detecting step; and
   detecting characteristic points of upper and lower lips that represent the outline of the mouth, employing positional data of the right and left corners obtained in the right and left corner detecting step,
   wherein the right and left corner detecting step comprises the steps of:
   calculating fourth characteristic amounts to be employed in mouth discrimination from a detected region that includes a mouth; and
   discriminating the positions of the right and left corners of the mouth by referring to fourth reference data, in which the fourth characteristic amounts and discriminating conditions corresponding thereto are defined, obtained in advance by learning the fourth characteristic amounts from a small tolerance sample image group including a plurality of sample images, which are known to be of mouths and in which positional relationships between the right and left corners thereof are normalized with a degree of tolerance smaller than the predetermined degree of tolerance, and a plurality of sample images, which are known not to be of mouths, with a machine learning method, while deforming the image of the mouth region in stepwise variations corresponding to the smaller degree of tolerance.

8. A facial characteristic point detecting apparatus, comprising:
   face detecting means for detecting a face included in an image, which is a target of detection;
   eye detecting means for detecting eyes within the detected face, employing the detection data obtained by the face detecting means;
   eye corner detecting means for detecting inner and outer corners of the detected eyes, employing the detection data obtained by the eye detecting means; and
   eyelid characteristic point detecting means for detecting characteristic points of upper and lower eyelids that represent the outline of the eyes, employing positional data of the inner and outer corners obtained by the eye corner detecting means,
   wherein the eyelid characteristic point detecting means detects characteristic points of the upper and lower eyelids by:
   setting at least one eyelid reference line segment, corresponding to the characteristic points, that intersects a line segment that connects the detected inner and outer corners of a detected eye;
   calculating characteristic amounts of one dimensional brightness distributions for discriminating the characteristic points, which are defined for the characteristic points corresponding to one of the at least one eyelid reference line segment, with respect to each pixel of the one eyelid reference line segment; and
   administering an eyelid characteristic point discriminating process, in which whether each of the pixels is a pixel that represents the characteristic point is discriminated, based on the characteristic amounts of the brightness distribution; wherein
   the eyelid characteristic point discriminating process is administered with respect to all of the set eyelid reference line segments.

9. A facial characteristic point detecting apparatus as defined in claim 8, wherein:
the eyelid characteristic point discriminating process is performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points from within a plurality of sample images of faces.

10. A facial characteristic point detecting apparatus, comprising:
face detecting means for detecting a face included in an image, which is a target of detection;
eye detecting means for detecting eyes within the detected face, employing the detection data obtained by the face detecting means;
eye corner detecting means for detecting inner and outer corners of the detected eyes, employing the detection data obtained by the eye detecting means; and
eyelid characteristic point detecting means for detecting characteristic points of upper and lower eyelids that represent the outline of the eyes, employing positional data of the inner and outer corners obtained by the eye corner detecting means,
wherein:
the face detecting means comprises:
first characteristic amount calculating means for setting a mask image within the detection target image and calculating first characteristic amounts to be employed in face discrimination from the mask image; and
first discriminating means for discriminating whether a face is included within the mask image by referring to first reference data, in which the first characteristic amounts and discriminating conditions corresponding thereto are defined, obtained in advance by learning the first characteristic amounts from a sample image group including a plurality of sample images, which are known to be of faces and in which positional relationships between the pairs of eyes are normalized with a predetermined degree of tolerance, and a plurality of sample images, which are known not to be of faces, with a machine learning method, while deforming the mask image in stepwise variations corresponding to the predetermined degree of tolerance;
the eye detecting means comprises:
second characteristic amount calculating means for calculating second characteristic amounts to be employed in face discrimination from a detected facial region; and
second discriminating means for discriminating the positions of eyes included in the face by referring to second reference data, in which the second characteristic amounts and discriminating conditions corresponding thereto are defined, obtained in advance by learning the second characteristic amounts from a small tolerance sample image group including a plurality of sample images, which are known to be of faces and in which positional relationships between the pairs of eyes are normalized with a degree of tolerance smaller than the predetermined degree of tolerance, and a plurality of sample images, which are known not to be of faces, with a machine learning method, while deforming the image of the facial region in stepwise variations corresponding to the smaller degree of tolerance; and
the eye corner detecting means comprises:
third characteristic amount calculating means for calculating third characteristic amounts to be employed in eye discrimination from a detected region that includes an eye; and
third discriminating means for discriminating the positions of the inner and outer corners of the eye by referring to third reference data, in which the third characteristic amounts and discriminating conditions corresponding thereto are defined, obtained in advance by learning the third characteristic amounts from a small tolerance sample image group including a plurality of sample images, which are known to be of eyes and in which positional relationships between the eyes and the inner and outer corners thereof are normalized with a degree of tolerance smaller than the predetermined degree of tolerance, and a plurality of sample images, which are known not to be of eyes, with a machine learning method, while deforming the image of the eye region in stepwise variations corresponding to the smaller degree of tolerance.

11. A facial characteristic point detecting apparatus as defined in claim 10, wherein the eye corner detecting means detects the inner and outer corners of the eye by:
referring to the third reference data, which has been obtained by performing learning employing sample images of only the left or right eye, based on the third characteristic amounts calculated from the image of the eye region, to discriminate the positions of the inner and outer corners of one of a right or left eye; and
referring to the third reference data, based on the third characteristic amounts calculated from the image of the eye region, which has been inverted in the horizontal direction, to discriminate the positions of the inner and outer corners of the other of the right or left eye.

12. A facial characteristic point detecting apparatus, comprising:
face detecting means for detecting a face included in an image, which is a target of detection;
eye detecting means for detecting eyes within the detected face, employing the detection data obtained by the face detecting means;
eye corner detecting means for detecting inner and outer corners of the detected eyes, employing the detection data obtained by the eye detecting means;
eyelid characteristic point detecting means for detecting characteristic points of upper and lower eyelids that represent the outline of the eyes, employing positional data of the inner and outer corners obtained by the eye corner detecting means;
mouth corner detecting means for detecting right and left corners of a mouth, which have predetermined positional relationships with the detected eyes, based on detection data obtained by the eye detecting means; and
lip characteristic detecting means for detecting characteristic points of upper and lower lips that represent the outline of the mouth, employing positional data of the right and left corners obtained by the mouth corner detecting means,
wherein the lip characteristic point detecting means detects the characteristic points of the upper and lower lips by:

setting at least one lip reference line segment, corresponding to the characteristic points, that intersects a line segment that connects the detected right and left corners of a mouth;

calculating characteristic amounts of one dimensional brightness distributions for discriminating the characteristic points, which are defined for the characteristic points corresponding to one of the at least one lip reference line segment, with respect to each pixel of the one lip reference line segment; and administering a lip characteristic point discriminating process, in which whether each of the pixels is a pixel that represents the characteristic point is discriminated, based on the characteristic amounts of the brightness distribution; wherein the lip characteristic point discriminating process is administered with respect to all of the set lip reference line segments.

13. A facial characteristic point detecting apparatus as defined in claim 12, wherein:

the lip characteristic point discriminating process is performed based on discriminating conditions corresponding to characteristic amounts of brightness distributions, which are learned in advance by a machine learning method employing characteristic amounts of brightness distributions of positions which are known to be the characteristic points and characteristic amounts of brightness distributions of positions which are known not to be the characteristic points, from within a plurality of sample images of faces.

14. A facial characteristic point detecting apparatus, comprising:

face detecting means for detecting a face included in an image, which is a target of detection;

eye detecting means for detecting eyes within the detected face, employing the detection data obtained by the face detecting means;

eye corner detecting means for detecting inner and outer corners of the detected eyes, employing the detection data obtained by the eye detecting means;

eyelid characteristic point detecting means for detecting characteristic points of upper and lower eyelids that represent the outline of the eyes, employing positional data of the inner and outer corners obtained by the eye corner detecting means;

mouth corner detecting means for detecting right and left corners of a mouth, which have predetermined positional relationships with the detected eyes, based on detection data obtained by the eye detecting means; and lip characteristic detecting means for detecting characteristic points of upper and lower lips that represent the outline of the mouth, employing positional data of the right and left corners obtained by the mouth corner detecting means, wherein the mouth corner detecting means comprises:

fourth characteristic amount calculating means for calculating fourth characteristic amounts to be employed in mouth discrimination from a detected region that includes a mouth; and fourth discriminating means for discriminating the positions of the right and left corners of the mouth by referring to fourth reference data, in which the fourth characteristic amounts and discriminating conditions corresponding thereto are defined, obtained in advance by learning the fourth characteristic amounts from a small tolerance sample image group including a plurality of sample images, which are known to be of mouths and in which positional relationships between the right and left corners thereof are normalized with a degree of tolerance smaller than the predetermined degree of tolerance, and a plurality of sample images, which are known not to be of mouths, with a machine learning method, while deforming the image of the mouth region in stepwise variations corresponding to the smaller degree of tolerance.

* * * * *